US010673258B2

(12) United States Patent
Kemppainen et al.

(10) Patent No.: US 10,673,258 B2
(45) Date of Patent: Jun. 2, 2020

(54) METHODS, APPARATUSES AND COMPUTER-READABLE INSTRUCTIONS FOR ACTIVATING CHARGING OF AN ELECTRIC VEHICLE

(71) Applicant: Nokia Technologies Oy, Espoo (FI)

(72) Inventors: Jarmo Kemppainen, Sunnyvale, CA (US); Jerome Beaurepaire, Berlin (DE)

(73) Assignee: NOKIA TECHNOLOGIES OY, Espoo (FI)

( * ) Notice: Subject to any disclaimer, the term of this patent is extended or adjusted under 35 U.S.C. 154(b) by 112 days.

(21) Appl. No.: 15/751,657

(22) PCT Filed: Aug. 17, 2015

(86) PCT No.: PCT/FI2015/050530
§ 371 (c)(1),
(2) Date: Feb. 9, 2018

(87) PCT Pub. No.: WO2017/029424
PCT Pub. Date: Feb. 23, 2017

(65) Prior Publication Data
US 2018/0241228 A1 Aug. 23, 2018

(51) Int. Cl.
*H02J 7/00* (2006.01)
*H02J 13/00* (2006.01)
(Continued)

(52) U.S. Cl.
CPC ............ *H02J 7/0027* (2013.01); *B60L 53/65* (2019.02); *B60L 53/66* (2019.02); *B60L 53/665* (2019.02);
(Continued)

(58) Field of Classification Search
CPC .... H02J 7/0027; H02J 7/0004; H02J 13/0089; B60L 53/66; B60L 53/665; B60L 53/65; G06Q 50/06; G06Q 50/30
(Continued)

(56) References Cited

U.S. PATENT DOCUMENTS 7,952,319 B2  5/2011  Lowenthal et al.
7,986,126 B1  7/2011  Bucci et al.
(Continued)

FOREIGN PATENT DOCUMENTS

EP  2109203  10/2009
EP  2711888 A1  3/2014
(Continued)

OTHER PUBLICATIONS

"Register for Charging", ESB, Retrieved on Feb. 16, 2018, Webpage available at : http://www.esb.ie/electric-cars/electric-car-charging/e-charging-access-and-payment.jsp.
(Continued)

*Primary Examiner* — Zixuan Zhou
(74) *Attorney, Agent, or Firm* — Mendelsohn Dunleavy, P.C.; Steve Mendelsohn

(57) ABSTRACT

This specification describes a method comprising: receiving, by a charging activation apparatus associated with an electric vehicle, a first instance of a charging session ID from first server apparatus associated with a first electricity provider which is the electricity provider of a driver or owner of the electric vehicle; receiving, by the charging activation apparatus, a second instance of the charging session ID from second server apparatus associated with a second electricity provider which is the electricity provider for a power outlet with which the electric vehicle is currently electrically connected; comparing, by the charging activation apparatus, the first and second instances of the charging session ID; and
(Continued)

determining, by the charging activation apparatus, if the first and second instances of the charging session ID correspond and, if the first and second instances of the charging session ID are determined to correspond, causing activation of charging of the electric vehicle via the electrical connection to the power outlet.

22 Claims, 8 Drawing Sheets

(51) Int. Cl.
    *B60L 53/66*     (2019.01)
    *B60L 53/65*     (2019.01)
    *G06Q 50/06*     (2012.01)
    *G06Q 50/30*     (2012.01)

(52) U.S. Cl.
    CPC .............. *G06Q 50/06* (2013.01); *G06Q 50/30* (2013.01); *H02J 7/00036* (2020.01); *H02J 13/0089* (2013.01); *H02J 7/00045* (2020.01); *Y02T 10/7055* (2013.01)

(58) Field of Classification Search
    USPC ............................................ 320/109; 701/22
    See application file for complete search history.

(56) References Cited

U.S. PATENT DOCUMENTS

| | | | |
|---|---|---|---|
| 8,417,402 | B2 | 4/2013 | Basir |
| 8,421,592 | B1 * | 4/2013 | Gunasekara .......... B60L 53/305 340/5.74 |
| 8,502,500 | B2 | 8/2013 | Baxter et al. |
| 8,983,875 | B2 | 3/2015 | Shelton et al. |
| 9,000,722 | B2 | 4/2015 | Uyeki |
| 9,037,507 | B2 | 5/2015 | Tate, Jr. |
| 2009/0313103 | A1 | 12/2009 | Ambrosio et al. |
| 2010/0114798 | A1 | 5/2010 | Sirton |
| 2010/0161481 | A1 | 6/2010 | Littrell |
| 2011/0184587 | A1 | 7/2011 | Vamos et al. |
| 2013/0110296 | A1 | 5/2013 | Khoo et al. |
| 2013/0138542 | A1 | 5/2013 | Sirton |
| 2013/0217409 | A1 | 8/2013 | Bridges et al. |
| 2013/0268433 | A1 | 10/2013 | Viner et al. |
| 2013/0275368 | A1 | 10/2013 | Camacho et al. |
| 2014/0103866 | A1 | 4/2014 | Kothavale et al. |
| 2014/0249976 | A1 | 9/2014 | Sugimura et al. |
| 2014/0257884 | A1 | 9/2014 | Kyoung |
| 2014/0289082 | A1 | 9/2014 | Seo et al. |

FOREIGN PATENT DOCUMENTS

| | | |
|---|---|---|
| EP | 2782063 | 9/2014 |
| WO | 2013/037748 A2 | 3/2013 |
| WO | 2014168376 | 10/2014 |

OTHER PUBLICATIONS

"Ecars Charge Point Map", ESB, Retrieved on Mar. 13, 2018, Webpage available at : http://www.esb.ie/electric-cars/electric-car-charging/e-charging-IT-system-map.pdf.
"North East England: Driving Change. Driving Electric", The Charging Point, Retrieved on Feb. 16, 2018, Webpage available at: http://www.thechargingpoint.com/knowledge-hub/North-East-England-Driving-Change-Driving-electric.html.
"Ev driver", Charge your car, Retrieved on Mar. 13, 2018, Webpage available at : http://www.chargeyourcar.org.uk/#ev-driver.
"Source London", Source London, Retrieved on Feb. 16, 2018, Webpage available at : https://www.sourcelondon.net/.
"How to Use the Service", Source London, Retrieved on Feb. 16, 2018, Webpage available at : https://www.sourcelondon.net/how-use-service.
"BMW Solves the Electric Car Charging Problem Using Street Lights", Geek.com, Retrieved on Feb. 16, 2018, Webpage available at : https://www.geek.com/news/bmw-solves-the-electric-car-charging-problem-using-street-lights-1609086/.
"BMW Develops Street Lights With Electric Car-Charging Sockets", Reuters, Retrieved on Feb. 16, 2018, Webpage available at : https://www.reuters.com/article/us-bmw-lighting-sockets/bmw-develops-street-lights-with-electric-car-charging-sockets-idUSKBN0IR14Q20141107.
Chynoweth et al., "Smart Electric VehicleCharging Infrastructure Overview", IEEE PES Innovative Smart Grid Technologies (ISGT) Conference, Feb. 19-22, 2014, 5 pages.
"Smart Charging—A Key to Successful E-Mobility", Technical Article, Jul. 2014, 4 pages.
Fries et al., "Securely Connecting Electric Vehicles to the Smart Grid", International Journal on Advances in Internet Technology, Jul. 2013, 10 pages.
"Power-Line Communication", Wikipedia, Retrieved on Feb. 16, 2018, Webpage available at : https://en.wikipedia.org/wiki/Power-line_communication.
Kempton et al., "Vehicle-to-Grid Power Implementation: From Stabilizing the Grid to Supporting Large-Scale Renewable Energy", Journal of Power Sources, vol. 144, No. 1, Jun. 1, 2005, pp. 280-294.
"Bluetooth Core Specification 4.2", Bluetooth, Dec. 2, 2014, 2772 pages.
Extended European Search Report received for corresponding European Patent Application No. 15901666.6, dated Mar. 6, 2019, 6 pages.
International Search Report and Written Opinion received for corresponding Patent Cooperation Treaty Application No. PCT/FI2015/050530, dated Jan. 4, 2016, 12 pages.
International Standard ISO 15118-1 "Road vehicles—Vehicle to grid communication interface—Part 1: General information and use-case definition", Reference No. ISO 15118-1:2013(E), ISO Geneva, Switzerland (Oct. 1, 2013), 72 pages.
International Standard ISO 15118-2 "Road vehicles—Vehicle-to-Grid Communication Interface—Part 2: Network and application protocol requirements", Reference No. ISO 15118-2:2014(E), ISO, Geneva, Switzerland (Apr. 1, 2014), 350 pages.
International Standard ISO 15118-3 "Road vehicles—Vehicle to grid communication interface—Part 3: Physical and data link layer requirements", Reference No. ISO 15118-3:2015(E), ISO, Geneva, Switzerland (May 15, 2015), 86 pages.
International Standard IEC 61851-23 "Electric vehicle conductive charging system—Part 23: DC electric vehicle charging station", Edition 1.0, IEC, Geneva, Switzerland (Mar. 2014), 164 pages.
International Standard IEC 61851-24 "Electric vehicle conductive charging system—Part 24: Digital communication between a d.c. EV charging station and an electric vehicle for control of d.c. charging", Edition 1.0, IEC, Geneva, Switzerland (Mar. 2014), 68 pages.

* cited by examiner

METHODS, APPARATUSES AND COMPUTER-READABLE INSTRUCTIONS FOR ACTIVATING CHARGING OF AN ELECTRIC VEHICLE

RELATED APPLICATION

This application was originally filed as PCT Application No. PCT/FI2015/050530 filed Aug. 17, 2015.

FIELD

This specification relates to methods, apparatuses and computer-readable instructions for activating charging of an electric vehicle.

BACKGROUND

Electric vehicle technology is constantly advancing and, although the number of electric vehicles on the roads is increasing, a major barrier to large scale adoption is a lack of suitable charging infrastructure and systems. This means that, although the benefits of electric vehicles may be clear, the risk of running out of charge in locations at which it is not possible to re-charge may deter many drivers from making use of such vehicles.

SUMMARY

In a first aspect, this specification describes a method comprising: receiving, by a charging activation apparatus associated with an electric vehicle, a first instance of a charging session ID from first server apparatus associated with a first electricity provider which is the electricity provider of a driver or owner of the electric vehicle; receiving, by the charging activation apparatus, a second instance of the charging session ID from second server apparatus associated with a second electricity provider which is the electricity provider for a power outlet with which the electric vehicle is currently electrically connected; comparing, by the charging activation apparatus, the first and second instances of the charging session ID; and determining, by the charging activation apparatus, if the first and second instances of the charging session ID correspond and, if the first and second instances of the charging session ID are determined to correspond, causing activation of charging of the electric vehicle via the electrical connection to the power outlet.

The method may comprise, if the first and second instances of the charging session ID are determined not to correspond, preventing charging of the electric vehicle via the electrical connection with the power outlet.

The method may comprise measuring, by the charging activation apparatus, a consumption of electricity by the electric vehicle whilst charging, and responding to a determination that charging of the electric vehicle has finished by outputting information including the measured consumption and charging session ID for provision to at least one of the first server apparatus and the second server apparatus.

The second instance of the charging session ID may be received along with an indication of approval of the charging session by the second electricity provider.

The method may comprise receiving from the power outlet identification information for enabling identification of the second electricity provider. The identification information for enabling the identification of the second electricity provider may enable identification of a customer of the second service provider with which the power outlet is associated. The method may comprise outputting, by the charging activation apparatus, the identification information for enabling identification of the second electricity provider for provision to at least one of the first and second server apparatuses. The identification information for enabling identification of the second electricity provider may in some examples be received by the charging activation apparatus via power line communication over the electrical connection between the electric vehicle and the power outlet.

The method may comprise, following a determination that it is desired to charge the electric vehicle using the power outlet, the charging activation apparatus outputting for transmission to the first server apparatus information including at least customer identification information for enabling the first electricity provider to identify the driver or owner. The information output by the charging activation apparatus may include a vehicle ID for enabling identification of the electric vehicle.

The method may comprise, in response to determining that that it is desired to charge the electric vehicle using the power outlet, outputting a charging request to the power outlet via power line communication over the electrical connection between the electric vehicle and the power outlet.

The method may comprise receiving, by the charging activation apparatus, the second instance of the charging entry ID from the second server apparatus via power line communication over the electrical connection with the power outlet.

The method may, in some examples, comprise outputting, by the charging activation apparatus, location information indicating a current location of the electric vehicle for provision to a third server apparatus configured to identify the second electricity provider based on at least the location information. In such examples, the method may comprise receiving, by the charging activation apparatus, a power outlet ID enabling identification of the power outlet, and outputting, by the charging activation apparatus, the power outlet ID and the location information for provision to the third server apparatus which is configured to identify the second electricity provider based on the location information and the power outlet ID. The method may further comprise identifying, by the third server apparatus, the second electricity provider and providing an electricity provider ID identifying the second electricity provider to the first server apparatus. The method may further comprise providing, by the first server apparatus, a charging request to the second server apparatus. The method may further comprise the second server apparatus responding to the charging request by determining if the charging request is to be approved and if so: providing a charging request approval message to the first server apparatus; or creating the charging session ID and distributing the charging session ID for receipt by the first server apparatus and the charging activation apparatus. The method may comprise providing, by the second server apparatus, the charging request approval message to the first server apparatus, and creating, by the first server apparatus, the charging session ID and distributing the charging session ID for receipt by the second server apparatus and the charging activation apparatus. The method may comprise providing, by the second server apparatus, to the first server apparatus along with the charging request approval message a customer ID identifying a customer of the second service provider with which the power outlet is associated. The charging session ID may be created by the first server apparatus based on the customer ID.

The method may comprise outputting, by the second server apparatus, the charging session ID for provision to the charging activation in response to the charging session being authorised.

The method may comprise creating, by the first server apparatus, the charging session ID and may further comprise outputting, by the first server apparatus, the charging session ID to the charging activation apparatus and the second server apparatus. Alternatively the method may comprise creating, by the second server apparatus, the charging session ID and may further comprise outputting, by the second server apparatus, the charging session ID to the charging activation apparatus and the first server apparatus.

The charging session ID may be created based on customer identification information for enabling the first electricity provider to identify the driver and identification of a customer of the second service provider with which the power outlet is associated.

In a second aspect, this specification describes apparatus configured to perform any method as described with reference to the first aspect.

In a third aspect, this specification describes computer-readable instructions which, when executed by computing apparatus, cause the computing apparatus to perform any method as described with reference to the first aspect.

In a fourth aspect, this specification describes apparatus comprising at least one processor and at least one memory including computer program code, which when executed by the at least one processor, cause a charging activation apparatus associated with an electric vehicle: to receive a first instance of a charging session ID from first server apparatus associated with a first electricity provider which is the electricity provider of a driver or owner of the electric vehicle; to receive a second instance of the charging session ID from second server apparatus associated with a second electricity provider which is the electricity provider for a power outlet with which the electric vehicle is currently electrically connected; to compare the first and second instances of the charging session ID; and to determine if the first and second instances of the charging session ID correspond and, if the first and second instances of the charging session ID are determined to correspond, to cause activation of charging of the electric vehicle via the electrical connection to the power outlet.

The computer program code, when executed by the at least one processor, may cause the charging activation apparatus to prevent the charging of the electric vehicle via the electrical connection with the power outlet if the first and second instances of the charging session ID are determined not to correspond.

The computer program code, when executed by the at least one processor, may cause the charging activation apparatus to measure a consumption of electricity by the electric vehicle whilst charging and to respond to a determination that charging of the electric vehicle has finished by outputting information including the measured consumption and the charging session ID for provision to at least one of the first server apparatus and the second server apparatus.

The second instance of the charging session ID may be received along with an indication of approval of the charging session by the second electricity provider.

The computer program code, when executed by the at least one processor, may cause the charging activation apparatus to receive from the power outlet identification information for enabling identification of the second electricity provider. The identification information for enabling the identification of the second electricity provider may enable identification of a customer of the second service provider with which the power outlet is associated. The computer program code, when executed by the at least one processor, may cause the charging activation apparatus to output the identification information for enabling identification of the second electricity provider for provision to at least one of the first and second server apparatuses. The identification information for enabling identification of the second electricity provider may, in some examples, be received by the charging activation apparatus via power line communication over the electrical connection between the electric vehicle and the power outlet.

The computer program code, when executed by the at least one processor may cause the charging activation apparatus, following a determination that it is desired to charge the electric vehicle using the power outlet, to output for transmission to the first server apparatus information including at least customer identification information for enabling the first electricity provider to identify the driver or owner. The information output by the charging activation apparatus may include a vehicle ID for enabling identification of the electric vehicle.

The computer program code, when executed by the at least one processor, may cause the charging activation apparatus, in response to determining that it that it is desired to charge the electric vehicle using the power outlet, to output a charging request to the power outlet via power line communication over the electrical connection between the electric vehicle and the power outlet.

The computer program code, when executed by the at least one processor, may cause the charging activation apparatus to receive the second instance of the charging entry ID from the second server apparatus via power line communication over the electrical connection with the power outlet.

The computer program code, when executed by the at least one processor, may cause the charging activation apparatus to output location information indicating a current location of the electric vehicle for provision to a third server apparatus configured to identify the second electricity provider based on at least the location information. The computer program code, when executed by the at least one processor, may further cause the charging activation apparatus to receive a power outlet ID enabling identification of the power outlet, and to output the power outlet ID and the location information for provision to the third server apparatus which is configured to identify the second electricity provider based on the location information and the power outlet ID. The apparatus may form part of a system which further comprises third server apparatus comprising at least one processor and at least one memory including computer program code, which when executed by the at least one processor, may cause the third server apparatus to identify the second electricity provider and providing an electricity provider ID identifying the second electricity provider to the first server apparatus. The system may further comprise the first server apparatus which comprises at least one processor and at least one memory including computer program code which when executed by the at least one processor may cause the first server apparatus to provide a charging request to the second server apparatus. The system may further comprise the second server apparatus which comprises at least one processor and at least one memory including computer program code which, when executed by the at least one processor, may cause the second server apparatus to respond to the charging request by determining if the charging request is to be approved and if so: to provide a charging request approval message to the first server apparatus; or to create the charging session ID and to distribute the charging session ID for receipt by the first server apparatus and the charging activation apparatus. The computer program code stored on the memory of the second server apparatus, when executed by the at least one processor, may cause the second server apparatus to provide the charging request approval message to the first server apparatus, and
wherein the computer program code stored on the memory of the first server apparatus, when executed by the at least one processor, may cause the first server apparatus to create the charging session ID and to distribute the charging session ID for receipt by the second server apparatus and the charging activation apparatus. The computer program code stored on the memory of the second server apparatus, when executed by the at least one processor, may cause the second server apparatus to provide to the first server apparatus along with the charging request approval message a customer ID identifying a customer of the second service provider with which the power outlet is associated. The charging session ID may be created by the first server apparatus based on the customer ID. The computer program code stored on the memory of the second server apparatus, when executed by the at least one processor, may cause the second server apparatus to output the charging session ID for provision to the charging activation in response to the charging session being authorised.

In some examples, the first server apparatus, which comprises at least one processor and at least one memory including computer program code, may create the charging session ID and may further output the charging session ID to the charging activation apparatus and the second server apparatus. In other examples, the second server apparatus, which comprises at least one processor and at least one memory including computer program code, may create the charging session ID and may further output the charging session ID to the charging activation apparatus and the first server apparatus.

The charging session ID may be created based on customer identification information for enabling the first electricity provider to identify the driver and identification of a customer of the second service provider with which the power outlet is associated.

In a fifth aspect, this specification describes computer-readable medium having computer-readable code stored thereon, the computer readable code, when executed by a least one processor, cause performance of at least: receiving, by a charging activation apparatus associated with an electric vehicle, a first instance of a charging session ID from first server apparatus associated with a first electricity provider which is the electricity provider of a driver or owner of the electric vehicle; receiving, by the charging activation apparatus, a second instance of the charging session ID from second server apparatus associated with a second electricity provider which is the electricity provider for a power outlet with which the electric vehicle is currently electrically connected; comparing, by the charging activation apparatus, the first and second instances of the charging session ID; and determining, by the charging activation apparatus, if the first and second instances of the charging session ID correspond and, if the first and second instances of the charging session ID are determined to correspond, causing activation of charging of the electric vehicle via the electrical connection to the power outlet. The computer-readable code stored on the medium of the fifth aspect may further cause performance of any of the operations described with reference to method of the first aspect.

In a sixth aspect, this specification describes apparatus associated with an electric vehicle, the apparatus comprising: means for receiving a first instance of a charging session ID from first server apparatus associated with a first electricity provider which is the electricity provider of a driver or owner of the electric vehicle; means for receiving a second instance of the charging session ID from second server apparatus associated with a second electricity provider which is the electricity provider for a power outlet with which the electric vehicle is currently electrically connected; means for comparing the first and second instances of the charging session ID; and means for determining if the first and second instances of the charging session ID correspond and, if the first and second instances of the charging session ID are determined to correspond, causing activation of charging of the electric vehicle via the electrical connection to the power outlet. The apparatus of the sixth aspect may further comprise means for causing performance of any of the operations described with reference to method of the first aspect.

BRIEF DESCRIPTION OF THE FIGURES

For a more complete understanding of the methods, apparatuses and computer-readable instructions described herein, reference is now made to the following description taken in connection with the accompanying figures in which.

DETAILED DESCRIPTION

Figure 1:
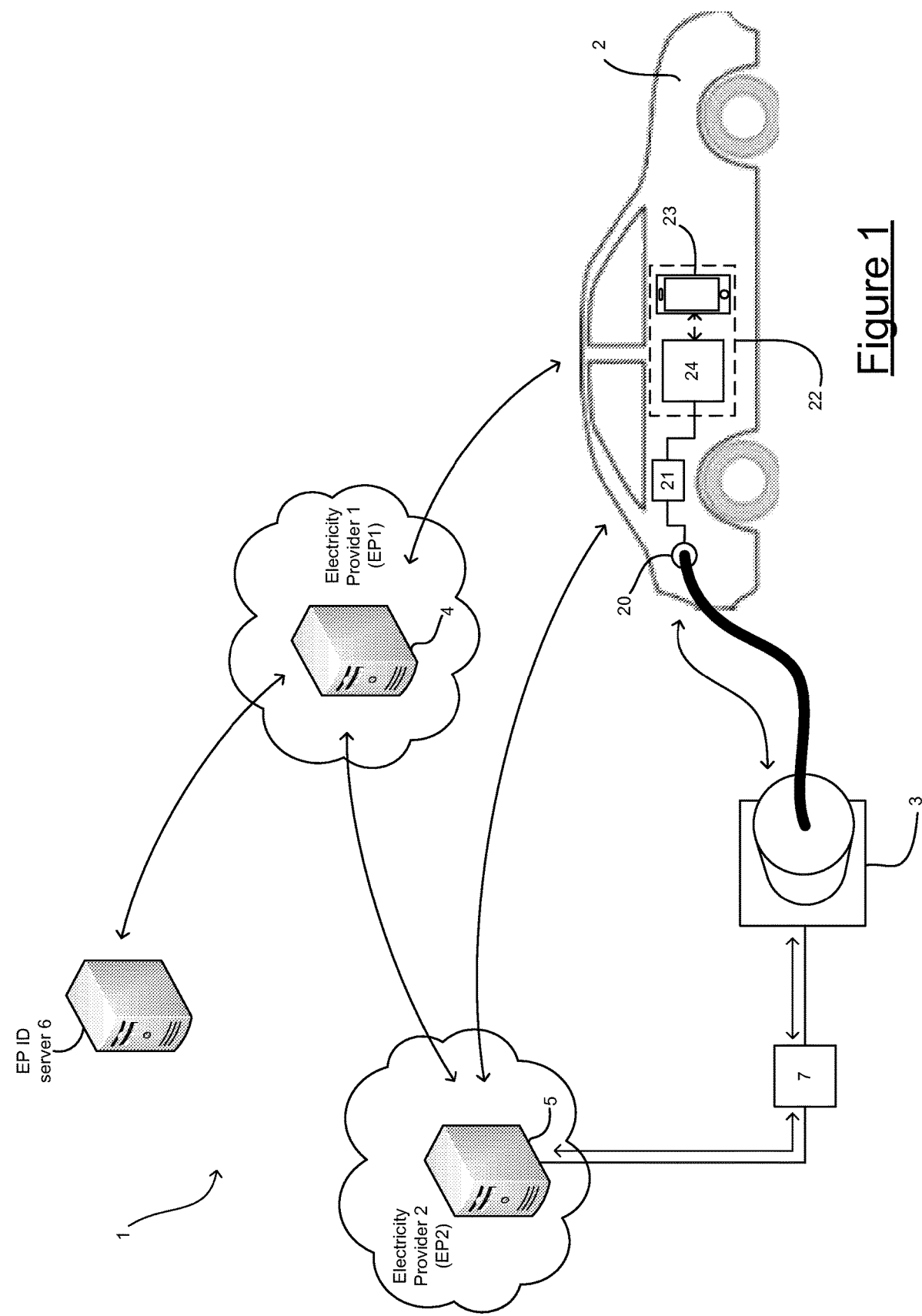
FIG. 1 is a simplified schematic of an electrical charging and authorisation system for an electric vehicle, according to one example embodiment.

In the description and drawings, like reference numerals may refer to like elements throughout.

FIG. 1 is a simplified schematic of an electrical charging and authorisation system 1 for an electric vehicle 2.

The system 1 comprises a power outlet 3 to which the electric vehicle 2 may be connected thereby to charge a battery (not shown) of the electric vehicle 2. As will be appreciated from the below discussion, the various entities within the system 1 are configured such that the electric vehicle 2 can be authorised to receive charge from any suitable power outlet at any location without requiring any major modifications to the existing power supply infrastructure. This may facilitate increased utilisation of electric vehicles as it may ensure that instances of electric vehicles running out of power and not being able to be re-charged are reduced.

The power outlet 3 illustrated in FIG. 1 is of any type that is suitable for charging an electric vehicle and may be at any location. For instance, the power outlet 3 may be at home, at a friend's home, at work or another's work, in a street light pole, in a public parking garage or lot, etc.

Associated with the electric vehicle 2 (or its driver) is a first electricity provider EP1 which includes first server apparatus 4. The first electricity provider EP1 may be the electricity provider with which the owner or driver of the electric vehicle 2, or the vehicle itself 2 has an agreement for the provision/supply of electricity.

Associated with the power outlet 3 is a second electricity provider EP2 which includes second server apparatus 5. The second electricity provider EP2 may be the electricity provider with which the owner of, or the administrator responsible for, the power outlet 3 has an agreement for the supply and payment of electricity via the power outlet 3.

The first and second server apparatuses 4, 5 are able to communicate with one another in any suitable manner, for instance via a wired data connection, a wireless data connection or a combination of wired and wireless. Typically, the first and second server apparatuses 4, 5 may be configured to communication via the internet, although the actual mode of communication may not be particularly important for implementation of the system and methods described herein.

In examples in which the necessary infrastructure is in place, the second server apparatus 5 at the second electricity provider EP2 may be able to provide data to the power outlet 3, for subsequent provision to the electric vehicle 2, via a power-line communication (PLC). In such examples, the electric vehicle 2 may be configured to receive data from the power outlet 3 via the power-line communication (PLC). In other examples, the power outlet may be configured to provide data to the electric vehicle via another communication protocol, such as but not limited to near field communication (NFC).

In examples in which data is provided over PLC, the system 1 may include a PLC switchboard function 7 for receiving data over PLC from the second electricity provider EP2 and routing it to the appropriate power outlet.

The electric vehicle 2 includes a charging port 20 via which the electric vehicle is connectable to the power outlet 3. In electrical communication with the charging port 20 is a transformer 21 configured to transform the electricity received from the power outlet 3 into a format that is suitable for charging the battery (not shown) of the electric vehicle 2.

The electric vehicle 2 includes a charging activation apparatus 22 which is configured to control charging of the battery for instance by controlling the operation of the transformer 21. The charging activation apparatus 22 is configured to activate charging (i.e. to permit power to be drawn from the power outlet for charging the battery) or to prevent charging (i.e. to prevent power to be drawn from the power outlet 3).

The charging activation apparatus 22 comprises an on-board aspect 24 and communications apparatus 23. The on-board aspect of the charging activation apparatus 24 may be physically integrated with the electric vehicle. The communications apparatus 23 may be physically integrated into the electric vehicle 2. In other examples, the communications apparatus 23 may be a portable communications device, such as but not limited to a mobile phone. In such examples, the portable communications device 23 may communicate with the on-board aspect 24 via a wired or wireless connection. The charging activation apparatus 22 may, in some examples, be configured to communicate with the second electricity provider EP2 over PLC.

The operations and functionality described below and assigned to the charging activation apparatus 22 may be performed solely by the on-board aspect 24 with the communications apparatus 23 (either integrated or portable) being responsible for the relay of information and data to and from the charging activation apparatus 22. This may be the case whether or not the communications apparatus 23 is integrated into the vehicle 2 or is a portable communications device such as a mobile phone.

Alternatively, the operations and functionality may be split between the on-board aspect 24 and the communications apparatus 23. For instance, the on-board aspect 24 may be configured to output the control signal that ultimately activates or prevents charging of the vehicle 2 but the prior processing that is performed in order to determine whether or not charging has been authorised may be performed by the communications apparatus 23. This may be the case, for instance, when the communications apparatus 23 is a portable device.

The charging activation apparatus 22 is configured to output information for provision to the at least one of the first and second server apparatuses 4, 5. The information output by charging activation apparatus 22 is transmitted to the server apparatuses 4, 5 via the communications apparatus 23. The charging activation apparatus 22 is operable also to receive data provided by the first and second server apparatus 4, 5 via the communications apparatus 23.

The communications apparatus 23 is configured to communicate wirelessly with the server apparatuses in any suitable way. For instance, the communications apparatus 23 may be configured to transmit and receive information via a cellular data protocol such as, but not limited to, 3G or 4G, or in areas in which a short range wireless data protocol, such as but limited to, a wireless local area network (WLAN) or Bluetooth™ (BT), is available, for example via a WLAN protocol such as an IEEE 802.11 protocol.

The charging activation apparatus 22 is configured to activate charging of the electric vehicle 2 via the electrical connection to the power outlet 3 if it is determined that first and second instances of a charging session identifier (ID) correspond. The first instance of the charging session ID is received from the first server apparatus 4 associated with the first electricity provider EP1 and the second instance of the charging session ID is received from the second server apparatus 5 associated with the second electricity provider EP2. If the first and second instances of the charging session ID are determined not to correspond, the charging activation apparatus 22 may be configured to prevent charging of the electric vehicle 2 via the electrical connection with the power outlet 3.

The charging activation apparatus 22 may be configured to output one or more various identifiers (IDs) and other information for provision to at least one of the first and second server apparatuses 4, 5. This may be performed in response to determining that charging of the electric vehicle 2 via the power outlet 3 is desired. This may be determined based on the charging activation apparatus 22 detecting that an electrical connection has been made or initiated with the power outlet 3. Alternatively, this may be determined based on an indication received via the communication apparatus 23.

The identifiers output by the charging activation apparatus 22 include at least an identifier for enabling the first electricity provider EP1 to identify the driver and/or owner of the vehicle. This may include a customer ID for allowing the first electricity provider to identify the driver or owner and/or a vehicle ID for enabling identification of the vehicle and therefore the registered owner of the vehicle. The customer ID may be, for instance, an account ID identifying an account which the driver or owner holds with the first electricity provider EP1. The identifiers for enabling the first electricity provider to identify the driver or owner of the vehicle may be stored in memory of the on-board aspect 24 of the charging activation apparatus 22. Alternatively, they may, for instance when the communication apparatus 23 is a portable communications device, be stored in memory of the communications apparatus 23. In other examples, one or more identifiers may be stored in the on-board aspect 24 (e.g. the vehicle ID) and others may be stored in memory of the communications apparatus 23 (e.g. the account ID). Information identifying the first electricity provider, e.g. an ID, name and/or IP (internet protocol) address, for enabling provision of data etc. to the first server apparatus 4 may additionally be stored in memory of the charging activation apparatus 22.

The identifiers and information output by the charging activation apparatus 22 may additionally include identification information for enabling identification of the second electricity provider EP2. This may include, for instance, an account ID, name and/or IP address, identifying an account which the owner of, or administrator responsible for, the power outlet 3 holds with the second electricity provider. This may be received by the charging activation apparatus 22 from the power outlet, via power line communication, NFC, scanning of a QR (Quick Response) code (for instance using the portable communications apparatus 23) or manual provision.

The identifiers and information for enabling identification of the second electricity provider may be received from the power outlet 3 automatically when electrically connected to it, or in response to a request sent from the charging activation apparatus 22, e.g. via PLC or NFC. The request may be provided to the power outlet 3 (e.g. via PLC or NFC) in response to the determination by the charging activation apparatus 22 that it is desired to charge the electric vehicle 3 using the power outlet 3.

In some examples, the identifier(s)/information output by the charging activation apparatus 22 is provided to the first server apparatus 4. This may be performed using an address or identifier of the first electricity provider that is stored at the charging activation apparatus 22. In such examples, the first server apparatus 4 is configured to create the charging session ID based at least in part on information/identifiers received from the charging activation apparatus 22. After creating the charging session ID, the first server apparatus 4 distributes the charging session ID to the second server apparatus 5, and the charging activation apparatus 22. In addition to the charging session ID, the first server apparatus 4 may also provide to the second server apparatus 5 with the information/identifiers received from the charging activation apparatus 22.

In other examples, in which the charging activation apparatus has an address for the second electricity provider, the identifier(s)/information output by the charging activation apparatus 22 is provided to the second server apparatus 5. In these examples, the second server apparatus 5 creates the charging session ID based at least in part on information/identifiers received from the charging activation apparatus 22. Once created, the charging session ID is distributed to the first server apparatus and the charging activation apparatus 22, for instance using an identifier or address for the first electricity provider which was included in the information received from the charging activation apparatus 22.

Regardless of which of the first and second server apparatuses 4, 5 creates the charging session ID, the second server apparatus determines whether the charging session can be authorised. This may be performed using any one or more of lists of allowed or banned first electricity providers, vehicle owners, vehicle drivers, vehicle types, or a number of different authorisation rules, such as charging allowed only during specific time and/or days, when electric network has capacity, or any combination thereof. In some examples, authorisation may include the second server apparatus 5 initiating communication with a device of the owner or administrator of the power outlet 3 in order to obtain explicit authorisation of the charging session.

The authorisation rules may additionally include one or more restrictions set by the owner or administrator of the power outlet. For instance the owner/administrator may have specified time periods during which ad hoc charging is permitted. The charging session may be authorised if the charging request is received within one of the specified periods.

If the second server apparatus 5 determines that the charging session is authorised, the second instance of the charging session ID is transmitted to the charging activation apparatus 22. In some instances, transmission of the second instance of the charging session ID is transmitted via PLC to the power outlet 3, from where it is provided to the charging activation apparatus 22. In other examples or additionally, the second instance of the charging session ID is transmitted directly to the charging activation apparatus 22 (i.e. without going to the power outlet 3), where it is received via the communication apparatus 23.

The second instance of the charging session ID may be provided by the second server apparatus 5 to the charging activation apparatus 22 along with an indication that the session has been approved by the electricity provider EP2 for the power outlet 3, for instance in the same message or data packet. This indication may take any suitable form.

The second instance of the charging session ID may be transmitted along with one or more charging parameters (which, for instance, may have been determined based on authorisation rules defined by the owner/administrator of the power outlet). The charging parameters may, for instance, include a maximum duration for charging session and/or a finish time at which point the charging session must finish. Other parameters may include a maximum amount of energy that is permitted to be consumed. For instance, the owner administrator may specify that ad hoc charging is permitted but only to enable the vehicle to reach an official charging outlet. As such, an amount of charge that is sufficient to enable the vehicle to reach the official charging point may be specified.

If the second server apparatus 5 determines that the charging session is not authorised, an indication of this is provided to the charging activation apparatus 22 (wirelessly or via the power outlet 3 using PLC). The charging activation apparatus 22 then responds by preventing charging of the electric vehicle 2 using the power outlet 3.

When the charging session ID is created by the second server apparatus 5, this may be performed prior to authorising the charging session or once the charging session has been authorised. It may, on average, be more efficient from a computational perspective to create the charging session ID once the session has been authorised.

The first server apparatus 4 is configured to provide the first instance of the charging session ID to the charging activation apparatus 22. This may be provided at one of a number of different times. For instance, it may be provided automatically in response to its creation by the first server apparatus 4 and prior to transmission to the second server apparatus 5. Alternatively, it may be provided to the charging activation apparatus 22 after it has been provided to the second server apparatus 5. In other examples, the first instance of the charging session ID may be provided to the charging activation apparatus 22 in response to receiving the charging session ID from the second server apparatus 5. Provision of the first instance of the charging session ID to the charging activation apparatus 22 may be directly to the charging activation apparatus where it is received via the communication apparatus 23.

The first and second instances of the charging session ID may be provided in such a way as to enable the charging activation apparatus 22 to determine their authenticity. For instance, each may be encoded in a particular manner, which enables the charging activation apparatus 22 to determine its origin. Alternatively, the first and second instances of the charging session ID may each be provided along with a unique identifier indicating the origin of the particular instance of the ID. The charging session may, in such examples, be activated if the first and second instances of the charging session ID are found to correspond and they are determined to be authentic.

After activating the charging of the vehicle 2, the charging activation apparatus 22 measures the consumption of electricity (electric energy) by the electric vehicle whilst charging the vehicle, and stores the consumption information. The charging activation apparatus 22 may terminate the charging based on the one or more charging parameters (e.g. end time, maximum duration, maximum permitted charge etc.) received with the second instance of the charging session ID. Termination of the charging session may include the charging activation apparatus 22 controlling the charging port 20 and/or transformer 21 to prevent the flow of charging current to the battery.

In response to a determination that charging of the electric vehicle has be terminated (by the charging activation apparatus 22 or by the user), the charging activation apparatus outputs a message, which may be referred to as a charging session record, for provision to at least one of the first and second server apparatuses 4, 5. The charging session record includes at least the measured electricity consumption and the charging session ID.

When transmitted to the first server apparatus 4, the data in the charging session record may be stored by the first server apparatus 4, which debits the account of the driver or vehicle owner by an amount corresponding to the measured electricity consumption (or charges them in some other way). After this, the charging session record including the measured consumption and the charging session ID is passed to the second server apparatus 5. The first server apparatus 4 also arranges reimbursement to the second electricity provider for the electricity consumed during the charging session. An indication of this reimbursement (e.g. a transaction identifier) is then provided to the second server apparatus 5. This may be communicated with the electricity consumption and charging session ID or at another suitable time.

Alternatively, when the charging session record is transmitted to the second server apparatus 5, the consumption may be stored by the second server apparatus 5 for instance in association with the charging session ID. The charging session record is then forwarded to the first server apparatus 4, which may charge the vehicle driver/owner and reimburse the second electricity provider as described previously.

As will be appreciated from the below discussion with reference to, for example, FIG. 5, in some examples, the system 1 may further include an electricity provider identification server apparatus 6 configured to identify a particular electricity provider based on received information and to output an identifier (ID) which identifies that electricity provider. The information may be received from the first server apparatus 4 and the first electricity provider identification server 6 may respond by sending the electricity provider ID (EP ID). In such examples, an outlet ID may be received at the charging activation apparatus 22 (e.g. using power line communication, NFC, scanning of a QR code or manual provision by the user). Alternatively or additionally, the charging activation apparatus 22 may be configured to determine its location, for instance via a global navigation satellite system (GNSS) module, such as global positioning system (GPS) and/or Global Navigation Satellite System (GLONASS). Alternatively, the location may be received from the power outlet in any of the ways described with reference to the outlet ID.

In such embodiments, the charging activation apparatus 22 is configured to output location information indicating the current location of the electric vehicle and/or the outlet ID for provision to electricity provider identification server 6. The electricity provider identification server 6 then, based on a database of outlet IDs and/or locations associated with power outlets, identifies the second electricity provider.

Subsequently, the electricity provider identification server 6 provides an electricity provider ID identifying the second electricity provider to the first server apparatus 4. The first server apparatus 4 is configured to provide a charging session request to the second server apparatus 5 in response to receiving the electricity provider ID.

The second server apparatus 5 is configured subsequently to respond to the charging session request by determining if the charging session request is to be authorised. This may be performed as described previously (e.g. using authorisation rules). If it determined that the charging session has been authorised, the second server apparatus 5 is configured to provide a request approval message for transmission to the first server apparatus 4. Alternatively, the second server apparatus 5 may respond by creating the charging session ID, which is then provided to the first server apparatus 4 and to the charging activation apparatus 22 (e.g. via the communications apparatus 23) as the second instance of the charging session ID.

If the second server apparatus 5 provides the request approval message to the first server apparatus, the first server apparatus 4 may be configured to respond by creating the charging session ID. This is then passed to the second server apparatus 5 and also to the charging activation apparatus 22 as the first instance of the charging session ID.

In some examples, the second server apparatus 5 may provide to the first server apparatus 4, along with the request approval message, a customer ID identifying the owner or administrator with which the power outlet 3 is associated. In such examples, the charging session ID may be created by the first server apparatus 4 based on the customer ID.

The above described system provides an electric vehicle charging system which utilizes existing power grid infrastructure so doesn't require investment and modification in power grid or delivery infrastructure. For instance, the charging activation apparatus 22, which is part of the electronic vehicle 2, monitors and records and the power consumption during a charging session and so no additional apparatus or device is required to be added to the existing infrastructure or power outlet to perform this function. In addition, the system allows any power outlet 3 to be used for charging. This reduces occurrences of electric vehicles running out of power and being unable to re-charge. The system also allows many simultaneous charging sessions to be carried out and monitored using separate power outlets but which are serviced by the same main switchboard.

The system also makes it possible to utilise existing electricity service contracts for service billing so there is no need for individual users/drivers to enter multiple service contracts with various proprietary service providers, depending on how the power is being used (e.g. domestic use or electric vehicle charging). Finally, the system is flexible in that it allows billing for the electricity consumed during a charging session from either of the vehicle owner's account or from the vehicle user's account.

Figure 2:
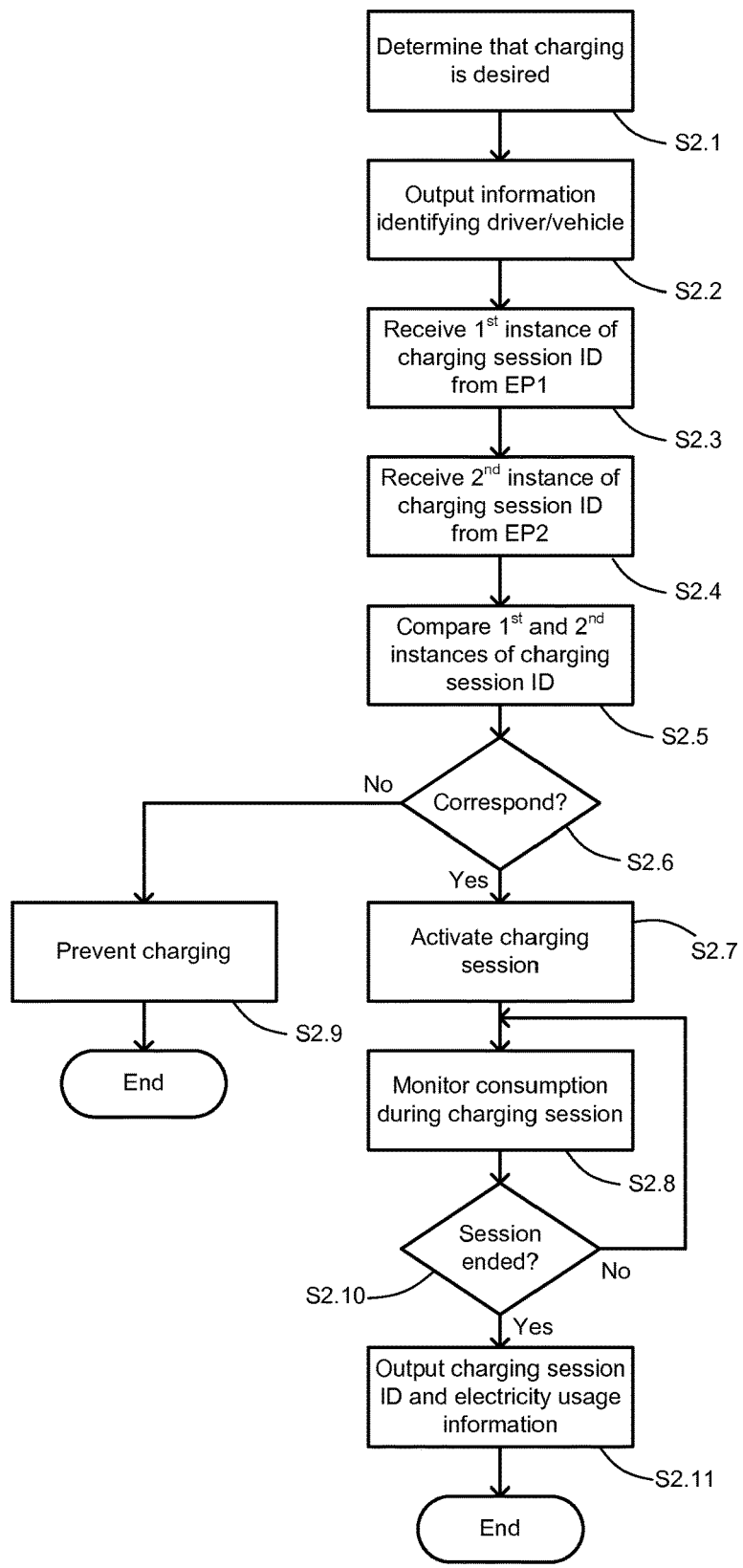
FIG. 2 is a flow chart illustrating various operations which may be performed by the charging activation apparatus of FIG. 1 in order to cause performance of a charging session, according to one example embodiment.

FIG. 2 is a flow chart illustrating various operations which may be performed by the charging activation apparatus 22 in order to enable performance of a charging session with any suitable power outlet.

In operation S2.1, the charging activation apparatus 22, determines that charging from a particular power outlet is desired. This determination may be performed in a number of different ways. For instance, in some examples, the charging activation apparatus 22 may detect formation of an electrical connection with the power outlet. Put another way, the charging activation apparatus may detect when a charging cable is electrically connected to both the power outlet 3 and the charging port 20 of the electric vehicle. In other examples, the determination may be made on the basis of information relating to the power outlet being received. For instance, the information may be received by the charging activation apparatus 22 via PLC from the power outlet or via NFC with, for example, the communication apparatus 23. Alternatively, the information presented by the power outlet 3 may be manually entered into the communication apparatus (particularly when it is in the form of a portable communications device), or may be manually scanned (e.g. a QR code) using the communications apparatus 23.

Subsequently, in operation S2.2, the charging activation apparatus 22 responds to the determination of S2.1 by outputting information and/or identifiers for provision to at least one of the driver's (or the owner's) electricity provider and the electricity provider associated with the power outlet. As discussed previously, the information and/or identifiers may include at least an identifier for enabling the first electricity provider to identify the driver/owner of the vehicle 2. This may be in the form of a vehicle ID which uniquely identifies the vehicle 2 and/or a customer ID (e.g. an electricity account ID) which uniquely identifies the driver/owner. It may be beneficial for the customer ID to be provided (either with or without the vehicle ID) as this ensures that the driver of the vehicle (and not always the owner) is responsible for paying for the consumed electricity. The customer ID may, for instance, be stored in memory of the communication apparatus 23, particularly where it is a portable communications device belonging to the driver. The vehicle ID may be stored in memory of either the on-board aspect 24 or the communications apparatus 23, although it may be beneficial for it to be stored in memory that is integrated with the vehicle.

Other information which may be output by the charging activation apparatus 22 includes an identifier for enabling identification of an agreement between the second electricity provider and the owner of/administrator responsible for the power outlet. This may be in the form of an account ID. The identifier may have been received from the power outlet in any suitable way, for instance via PLC, NFC or RFID (Radio-Frequency Identification). Alternatively, it may have been presented in some form on or near the power outlet 3 and may be have been scanned e.g. using the communication apparatus 23 or manually entered by the driver/user.

Other information which may be output includes an outlet ID for enabling identification of the particular power outlet and/or location information indicating a current location of the electric vehicle 2. This may be provided in addition to the identifier for enabling identification of an agreement between the second electricity provider and the owner of/administrator in which case it might be used to ensure the authenticity of the identifier. In other examples, it may be provided instead of the identifier for enabling identification of an agreement between the second electricity provider and the owner of/administrator, for instance because that identifier is not available.

The information/identifiers output by the charging activation apparatus 22 are transmitted wirelessly to one of the first and second server apparatuses 4, 5 by the communication apparatus 23. The transmission may be based on a stored address, for instance when the transmission is to the first server apparatus 4 of the driver/owner's electricity provider EP1. Alternatively, it may be based on an address received from the power outlet 3 or derived from information presented on the outlet 3, for instance when the transmission is to the electricity provider associated with the power outlet 3.

Next, in operation S2.3, the charging activation apparatus 22 receives, via the communication apparatus 23, the first instance of the charging session ID from the first server apparatus 4. As discussed above, this may be provided in such a way that the charging to activation apparatus 22 is able to verify that it has been received from the first server apparatus 4 of the driver/owner's electricity service provider.

In operation S2.4, the charging activation apparatus 22 receives the second instance of the charging session ID from the second server apparatus 5. As with the first instance, this may be provided in such a way that the charging activation apparatus 22 is able to verify that it has been received from the second server apparatus 4 of the power outlet's electricity service provider. The second instance of the charging session ID may be received from the power outlet (e.g. via PLC) and/or may be received via the communication apparatus 23. The second instance of the charging session ID may also be accompanied by an indication that the charging session has been approved by the power outlet's electricity provider. This indication may be required before the charging activation apparatus 22 will proceed to operations S2.5 and S2.6. Alternatively, the receipt of the second instance of the charging session ID may be taken as implicit approval of the charging session.

In operation S2.5, the charging activation apparatus 22 compares the first and second instances of the charging session ID. In operation S2.6, the charging activation apparatus 22 determines if the two instances correspond/match. If they do not sufficiently correspond, the charging activation apparatus 22 proceeds to operation S2.9 in which charging of the vehicle via the power outlet is prevented. For instance, the charging activation apparatus 22 may control the transformer 21 to remain de-activated. In other examples the charging activation apparatus 22 may control the charging port 20 or a switch coupled with the charging port 20 thereby to prevent electricity from flowing through (for instance by keeping the switch "open").

If, in operation S2.6, the first and second instances of the charging session ID are found to sufficiently correspond, operation S2.7 is performed. In operation S2.7, the charging activation apparatus 22 activates (or allows) charging of the vehicle 2. This may be performed based on a control signal provided to the transformer 21 or the charging port 20.

Subsequently, in operation S2.8, the charging activation apparatus 22 monitors/measures the electricity received from the power outlet 3 during the charging session. Next, in operation S2.10, the charging activation apparatus 22 determines if the charging session has ended. This may be determined in any suitable manner. For instance, the charging activation apparatus 22 may detect when the electrical connection between the power outlet 3 and the charging port 20 is disconnected (e.g. when the charging cable is removed) or may monitor the charge level of the battery to determine when the battery is fully charged.

If charging is determined not to have finished, the charging activation apparatus 22 continues to monitor the electricity consumption. If however, the charging session is determined to have finished the charging activation apparatus 22 proceeds to operation S2.11.

In operation S2.11, the charging activation apparatus 22 causes provision of a charging session record to at least one of the first and second server apparatuses 4, 5. The charging session record includes at least the measured consumption for the charging session and the charging session ID. This enables the two electricity providers to arrange payment and reimbursement for the consumed electricity during the charging session.

As will be appreciated, the flow chart of FIG. 2 is just an example only. As such, the order of operations may be different to that shown in the Figure. For instance, in some examples, the order in which the first and second instances of the charging session ID are received in operations S2.3 and S2.4 may be reversed.

Various examples of process flows throughout the whole system 1 will now be described with reference to FIGS. 3 to 6.

Figure 3:
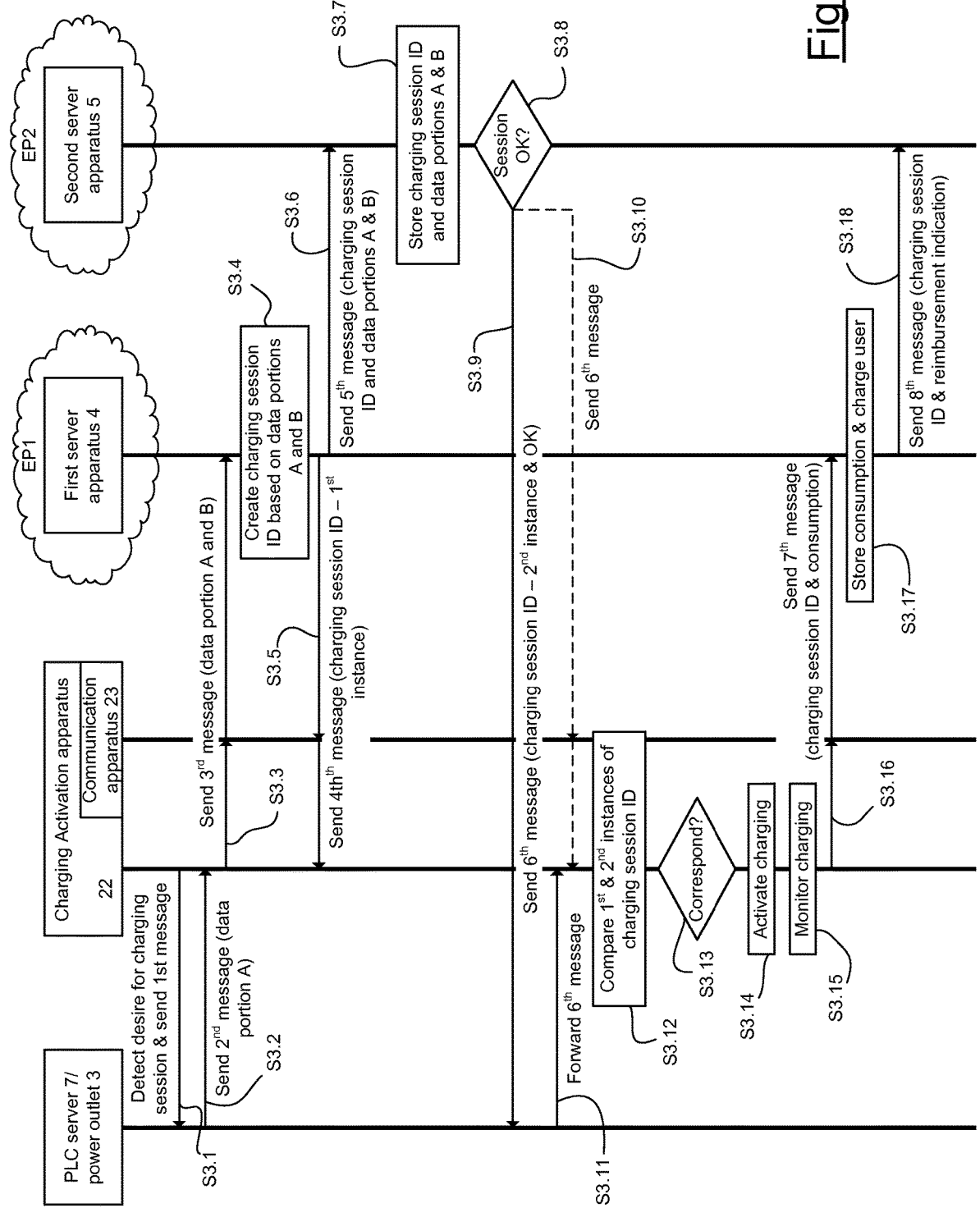
FIGS. 3 to 6 illustrate various process flows and operations which may be performed by the various entities which make up the electrical charging and authorisation system shown in FIG. 1, according to one example embodiment.

FIG. 3 is an example of a process flow in which the electricity provider identification server 6 is not involved.

In operation S3.1, the charging activation apparatus 22 detects an electrical connection between the charging port 20 of the vehicle 2 and the power outlet 3, for example that the user of the vehicle has connected a charging cable between the charging port 20 of the vehicle 2 and the power outlet 3. In response to this detection, the charging activation apparatus 22 causes provision, that may be automatic, to the power outlet 3 via PLC over the charging cable of a charging request (which may be referred to as "a first message"). The charging request propagates from the outlet to a PLC switchboard function 7 associated power outlet. As discussed previously, the power outlet 3 may be at home, at friend's place, at work, in a street light pole, in a public parking garage etc. The PLC switchboard function 7 may for instance provide switchboard functionality for PLC communication via a number of outlets in the same premises or area.

In operation S3.2, the PLC switchboard function responds to the charging request by sending to the charging activation apparatus 22 using PLC via the power outlet a charging request response (the "second message"). The charging request response includes, in this example, at least one of an electricity provider ID for enabling identification of the electricity service provider to the power outlet and a customer ID for allowing identification of the customer of the identified electricity provider. This may be in any suitable form, for instance it may include an account ID, which enables identification of both the electricity provider and the customer or it may alternatively include an account ID in addition to a dedicated customer ID. The information received from the power outlet which includes one or more identifiers which enable identification of both the electricity provider and the customer may be referred to as "data portion A". Alternatively, the power outlet 3 and/or the PLC switchboard function 7 can provide the response when the electrical connection via the charging cable between the charging port 20 of the vehicle 2 and the power outlet 3 is created, without any charging request to the PLC capable switchboard 7, i.e. the switchboard 7 can transmit the charging request response, such as the "data portion A", over the PLC in a frequent manner.

In operation S3.3, the charging activation apparatus 22 responds to receipt of the charging request response by causing provision, via the communication apparatus 23, of a third message. In this example, the third message is transmitted wirelessly to the first electricity provider EP1 where it arrives at the first server apparatus 4. The third message includes information for enabling the first electricity provider to identify the driver/owner of the vehicle ("data portion B"). In specific this example, data portion B includes an account ID identifying an account of the driver/owner of the vehicle and a vehicle ID. In this example, the third message also includes the data portion A received from the power outlet 3.

As discussed with reference to FIG. 1, the communication apparatus 23 may be integrated into the vehicle or may be a portable communication apparatus capable of forming a data connection with the on-board aspect 24 of the charging activation apparatus 22. In some examples, if the driver is the vehicle's owner, the third message may be transmitted via the integrated communication apparatus 23, whereas if the driver is not the vehicle's owner, the third message may instead be transmitted via a portable communication device 23 associated with the driver. In this case, the on-board aspect 24 transmits the third message to the portable communication device 23 over a wireless or wired data connection.

Next, in operation S3.4, following receipt of the third message, the first server apparatus 4 creates a charging session ID for the charging session based on data portions A and B. The charging session ID is then stored in memory at the first server apparatus 4.

After creation of the charging session ID, in operation S3.5, the first server apparatus 4 causes provision of a fourth message, including the first instance of the charging session ID, to the charging activation apparatus 22, where it is received via the communications apparatus 23. On receipt by the charging activation apparatus 22, the first instance of the charging session ID is stored in memory of the charging activation apparatus 22. Additionally, the charging session ID is stored in memory of the communications apparatus 23.

In operation S3.6, the first server apparatus 4, causes provision of the charging session ID to the electricity provider associated with the power outlet 5, specifically the second server apparatus 5. This may be referred to as a fifth message. The fifth message may include, in addition to the charging session ID, data portions A and B.

In operation S3.7, the second server apparatus (of the second electricity provider associated with power outlet) stores the contents of the fifth message, which in this example includes the charging session ID and data portions A and B.

After receipt of the fifth message, in operation S3.8, the second server apparatus 5, determines whether the charging session is to be authorised. This may include analysing the charging session ID and the information in data portions A and B based on one or more authorisation rules. This may enable a determination, for instance, as to whether the vehicle owner/driver is blacklisted, whether the current time is within a specified time period during which ad hoc charging is permitted. Operation S3.8 may also or alternatively include initiating communication with a device associated with the owner/administrator of the power outlet (who is identified using the information in data portion A) to obtain an explicit authorisation for the charging session.

Although not shown on FIG. 3, if the charging session is not authorised, this may be communicated to the charging activation apparatus 22 via one or both of the communication apparatus 23 and the power outlet 3. In response to this, the charging activation apparatus 22 prevents charging of the vehicle 2. The driver's electricity provider may also be notified that the charging session has been declined.

If, however, the charging session is authorised, the second server apparatus 5, sends a sixth message which includes the second instance of the charging session ID for receipt by the charging activation apparatus 22. This may be transmitted to the charging activation apparatus 22 over PLC to the PLC switchboard function 7 (in operation S3.9) and/or wirelessly to the communication apparatus 23 (in operation S3.10). The sixth message may additionally include the indication of authorisation of the charging session (shown in the FIG. 3 as "OK"). If the sixth message is transmitted via the PLC switchboard function, this is relayed to the charging activation apparatus 22 via the power outlet 3 and charging port 20 in operation S3.11. As discussed, previously the sixth message may include one or more charging parameters (for instance, based on user defined rules) based on which the charging activation apparatus 22 controls the charging session.

Following receipt of the first and second instances of the charging session ID, the charging activation apparatus 22, in operation S3.12, compares the first and second instances. Next in operation S3.13, the charging activation apparatus 22 determines if they are found to correspond. If the first and second instances of the charging session ID are found to correspond, the charging activation apparatus 22 in operation S3.14 activates charging of the vehicle. Although not shown in the Figure, if the first and second instances are determined not to match, charging of the vehicle 2 is prevented.

During charging (in operation S3.15) the charging activation apparatus 22 monitors the electricity consumption (e.g. in kWh) and terminates the session if specified by the charging parameters (e.g. because a maximum charge or charging duration has been reached or because permitted ad hoc charging period has ended). When the charging session is determined to have ended, the charging activation apparatus 22 causes transmission of the seventh message (in operation S3.16). The seventh message, which may also be referred as the charging session record, includes the charging session ID and the measured energy usage from the charging session. In this example, the seventh message is transmitted to the first server apparatus of 4 of the driver/vehicle owner's electricity provider.

In operation S3.17, on receipt of the seventh message, the first server apparatus 4 stores the electric energy consumption and charges (i.e. sends the billing information) the driver/vehicle owner for the energy used during the charging session. In operation S3.18, second server apparatus sends an eighth message to the server apparatus 5 of the electricity provider for the power outlet 3. The eighth message includes the charging session entry ID and an indication that the first electricity provider has or will reimburse the second electricity provider for the value of the electricity consumed during the charging session. The eighth message may be referred to as a reimbursement indication message.

Figure 4:
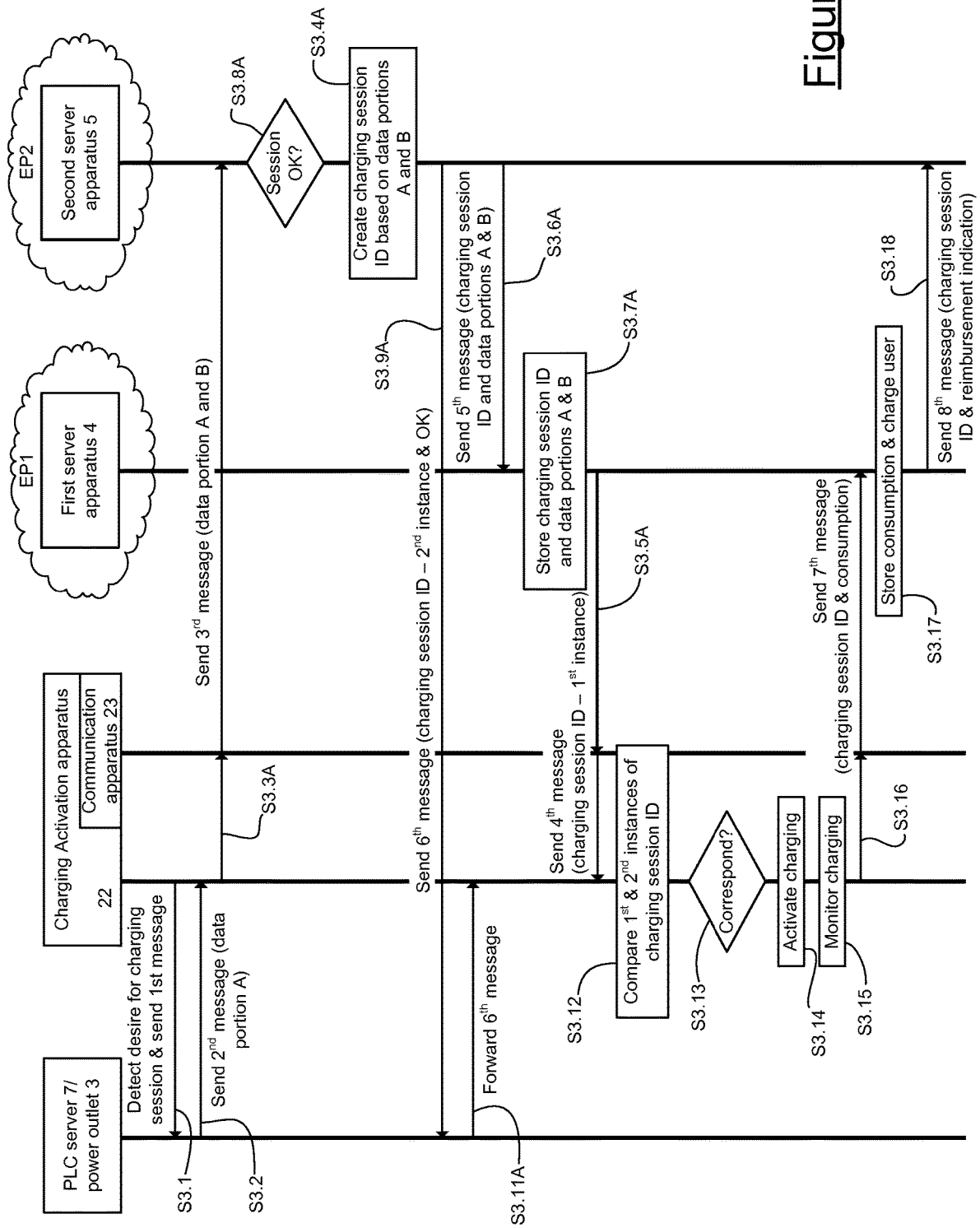

FIG. 4 is a process flow showing an example of a different order in which the operations described with reference to FIG. 3 may be performed. Where the operation is denoted by a reference numeral which was present in FIG. 3, the operation may be performed as described with reference to FIG. 3. Where a reference is suffixed by an "A", the operation may be substantially the same as the corresponding reference numeral described in relation to FIG. 3 but may be performed by (or otherwise relate to) a different entity and/or may be performed at a different point in the overall process.

In the example of FIG. 4, operations S3.1 and S3.2 are as described with reference to FIG. 3.

After receiving the second message, the charging activation apparatus 22 causes transmission (in operation S3.3A) of the third message to the second electricity provider server 5 instead of to the first electricity provider as was the case in FIG. 3.

After receiving the third message, the second electricity provider server apparatus 5 performs operation S3.8A in which it is determined if the charging session is to be authorised. This may be substantially the same as operation S3.8 described with reference to FIG. 3.

If it is determined that the charging session is authorised, the second server apparatus 5 proceeds to operation S3.4A in which the charging session ID is created. Creation of the charging session ID may be substantially as described with reference to operation S3.4 of FIG. 3.

Next, in operation S3.9A (which may be substantially the same as operation S3.9 described with reference to FIG. 3), the sixth message is transmitted to the PLC switchboard function, which in operation S3.11 forwards the sixth message over PLC to the charging activation apparatus 22. The sixth message includes the second instance of the charging session ID, although, in this example, it may be received at the charging activation apparatus 22 prior to the first instance. Although not shown, the process may include an alternative or additional operation in which the sixth message is provided by the second server apparatus 5 to the communication apparatus 23 of the charging activation apparatus 22 (e.g. similar to S3.10).

In operation S3.6A (which may be similar to operation S3.6), the second electricity server apparatus 5 provides the fifth message including at least the charging session ID to the first server apparatus of the driver/owner's electricity provider.

In response to receiving the fifth message, in operation S3.7A, the first electricity provider server apparatus 4 stores the charging session ID along with data portions A and B.

Subsequently, in operation S3.5A, the first electricity provider server apparatus 4 transmits the first instance of the charging session ID to the charging activation apparatus 22 in an equivalent to the fourth message described with reference to FIG. 3.

After operation S3.5A, operations S3.12 to S3.18 are performed in the manner described with reference to FIG. 3.

Figure 5:
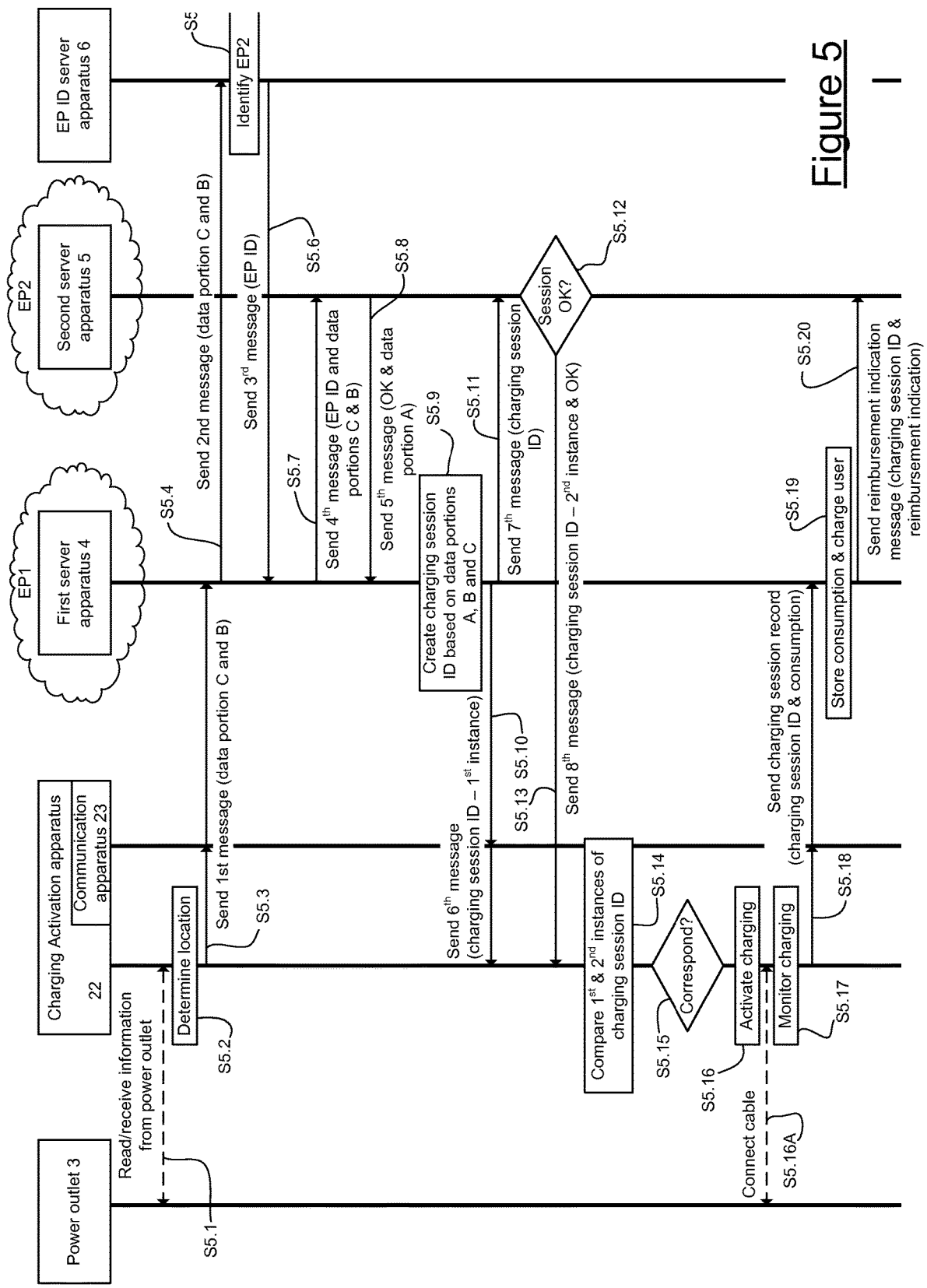

FIG. 5 is a process flow in which the electricity provider identification server 6 is utilised. Processes which involve the electricity provider identification server 6 (such as the example shown in FIG. 5) may be utilised for instance in situations where the power outlet 3 and electricity infrastructure are not configured for PLC.

In operation S5.1, the vehicle driver reads/inputs outlet information for enabling identification of the power outlet (which may be referred to as a socket ID or a power outlet ID). This may be performed manually (e.g. by entering a code presented in association with the outlet 3) using a user interface associated with the charging activation apparatus 22. The user interface may be integrated into the vehicle 3 or may be the user input interface (UII) of the portable communications device 23. Alternatively, the driver may use the portable communications device 23 to scan a QR code or to receive the information from the outlet via RFID or NFC.

Additionally or alternatively, the charging activation apparatus 22 may, in operation S5.2, determine the current location of the vehicle 2. This may be performed in response to receiving the outlet ID or, in other examples, may be performed without first receiving the outlet ID. The determining of the location may be performed in any suitable way, for instance using a GNSS module. After the location is determined, the location may be stored along with or without the outlet ID. Also, in some examples, "location-type" information, such as a residential location, street location, street type, etc., might be stored along with the determined location. The location-type can be a map specific attribute that can be detected from a location related map data.

Next, in operation S5.3, the charging activation apparatus 22 sends a first message to the server apparatus 4 of the driver's electricity provider. The first message may include data portion B (as described with reference to operation S3.3 of FIG. 3, which includes at least information for enabling the first electricity provider to identify the driver/owner of the vehicle) as well as "data portion C". Data portion C includes at least one of the outlet ID and/or the location information. Where the location is included, data portion C may also include the location-type information. The first message of FIG. 5 may be transmitted in a similar manner to the third message of FIG. 3.

Upon receipt of the first message, the first electricity provider server apparatus 4, in operation S5.4, causes transmission of a second message to the electricity provider identification server 6. The second message includes at least a data portion C and a request for an identifier of the electricity provider (EP ID) associated with the power outlet 3. The second message may additionally include data portion B.

In operation S5.5, the electricity provider identification server 6 identifies the electricity provider for the power outlet based on the information in data portion C. For instance, the electricity provider identification server 6 may search a database based on the outlet ID and/or the location information to identify the electricity provider associated with the power outlet 3.

In operation S5.6, the electricity provider identification server 6 sends a third message, which includes at least the electricity provider ID of the identified electricity provider, to the first electricity provider server apparatus 4. In some examples, the third message may additionally include data portions B and C.

In response to receiving the third message, the server apparatus 4 of the first electricity provider sends a request S5.7 to the identified electricity provider associated with the power outlet. The request, which may be referred to as the fourth message, may be e.g. a request for an ad hoc agreement, for the utilisation of energy at the current location (as defined by the location information and/or the outlet ID). The third message may include the EP ID and data portions B and C.

If the electricity provider associated with the power outlet 3 allows the use of its electricity, the second server apparatus 5 may respond to the fourth message by transmitting (in operation S5.8) a fifth message back to the driver's electricity service provider EP1. The fifth message may include an indication of approval of the charging ("OK"), e.g. approval of the ad hoc agreement, and information similar to data portion A (described above with reference to FIG. 3) which identifies an account held by the owner of, or the administrator responsible for, the power outlet 3.

In response to receiving the fifth message, the server apparatus 4 of the first driver's electricity provider EP1 may create the charging session ID in operation S5.9. This may be created based on data portions A and B and, in some examples, also data portion C.

In operations S5.10 and S5.11, which may be performed in either order, the first server apparatus 4 causes transmission of the charging session ID, in sixth and seventh messages respectively, to the charging activation apparatus 22 and the electricity provider EP2 associated with the power outlet 3.

The second server apparatus 5, in response to receiving the seventh message determines whether to authorise the charging session in operation S5.12. This may be performed as described with reference to operations S3.8 and S3.8A.

Once the session is authorised, the second server apparatus in operation S5.13 causes wireless or wired transmission of an eighth message including the second instance of the charging session ID to the charging activation apparatus 22. As discussed previously, this may include one or more charging parameters based on which the charging session apparatus 22 controls the charging session.

In operation S5.14, charging activation apparatus 22 compares the second instance of the charging session ID with the first instance received in the sixth message. This may be as described with reference to operation S3.12 in FIG. 3. Indeed, subsequent operations S5.15 to S5.20 may be substantially the same as operations S3.13 to S3.18 described with reference to FIG. 3.

The process of FIG. 5 may include an additional operation of S5.16A of the electrical connection between the charging port 20 and the power outlet 3 being formed and/or detected (e.g. the charging cable being connected). This must, of course, occur prior to charging taking place but, if it occurs after the charging activation apparatus 22 activates the charging session in operation S5.16, charging will commence immediately on formation of the electrical connection.

It will thus be understood that the process of FIG. 5 enables charging, such as ad hoc provision, of electric vehicle charging even when PLC isn't available at the power outlet and/or information for identifying the electricity provider associated with the power outlet is not immediately derivable from the power outlet 3. However, as will also be appreciated, the process of FIGS. 3 and 4 may apply in situations in which PLC is not available if the information identifying the electricity account associated with the power outlet is derivable from the power outlet in some other way.

Figure 6:
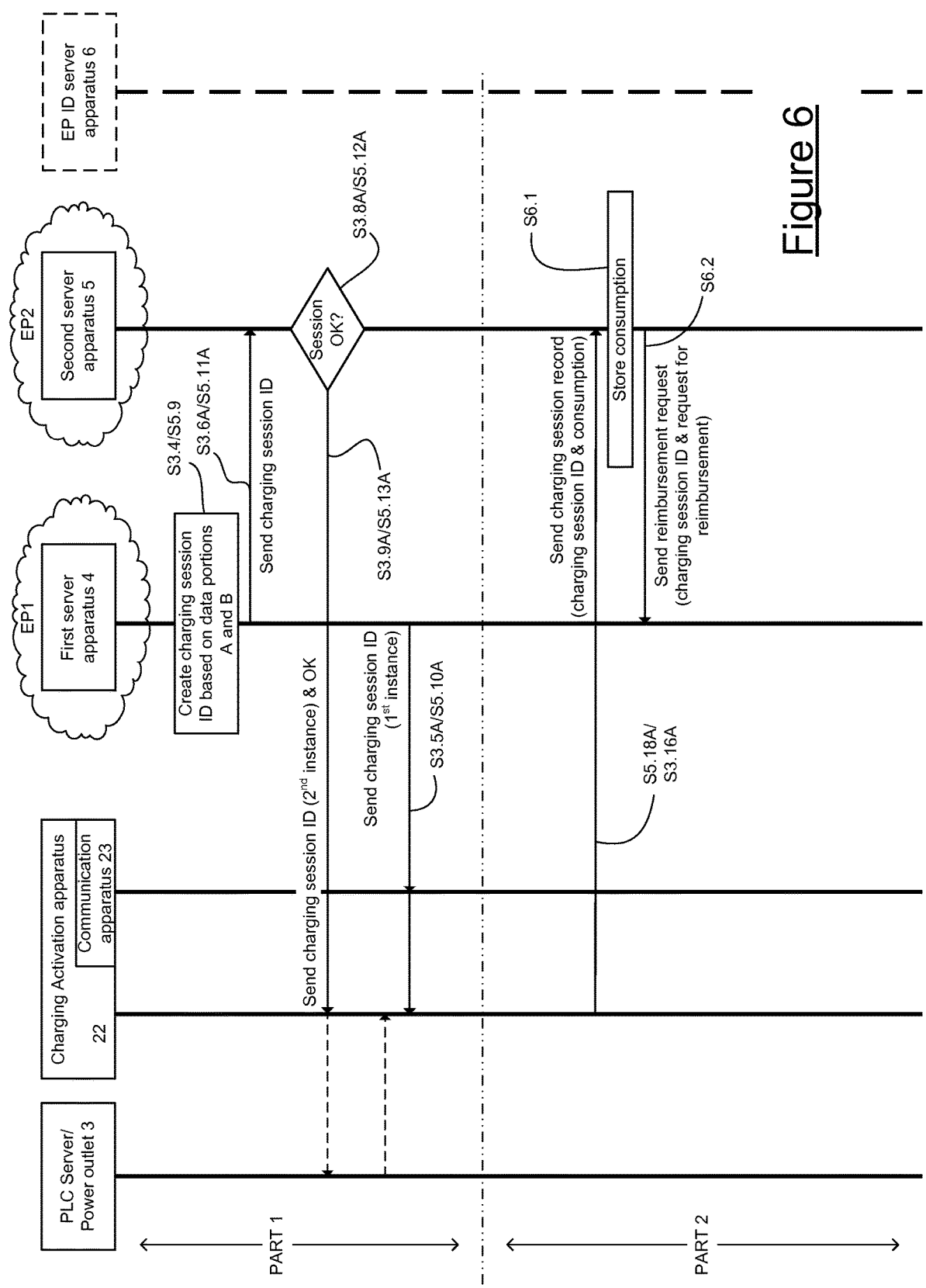

FIG. 6 is a process flow showing examples of different orders in which various operations described with reference to FIGS. 3 and 5 may be performed. Where the operation is denoted by a reference numeral which was present in FIG. 3 or FIG. 5, the operation may be performed as described with reference to that Figure. Where an a reference for an operation is suffixed by an "A", the operation may be substantially the same as the corresponding reference numeral described with reference to FIG. 3 or FIG. 5 but may be performed by (or otherwise relate to) a different entity and/or may be performed at a different point in the overall process.

The process of FIG. 6 is not complete and omits various process and operations which are performed exactly as and when described with reference to FIGS. 3 and 5. Moreover, the process flow of FIG. 6 comprises first and second parts, which are above and below the dotted line. The first part includes operations which may occur before the charging session takes place, whereas the second part includes operations which may take place after the charging session takes place. The process flows of each of FIGS. 3 and 5 may, in some examples, be adapted in accordance with the first part of FIG. 6, the second part of FIG. 6 or both of the first and second parts.

The first part of the alternative pre-charging process flow of FIG. 6 starts with creation of the charging session ID by the first server apparatus 4 of EP1. This may be as described with reference to either of operations S3.4 and S5.9.

Next, in operation S3.6A/S5.11A, the charging session ID is sent to the second server apparatus 5 of EP2. This operation may be performed similarly to either of operations of S5.11 and S3.6. However, the performance of this operation immediately after creation of the charging session ID differs from the process flows of FIGS. 3 and 5 in which the charging session ID is provided to the second server apparatus 5 after provision of the first instance of the charging session ID to the charging activation apparatus 22.

After approval of the charging session by the second server apparatus in operation S3.8A/5.12A, the second server apparatus causes provision (in operation S3.9A/5.13A) of the second instance of the charging session ID and the approval indication "OK" to the charging activation apparatus 22. This is performed either over PLC via the power outlet (as illustrated by dashed arrows in FIG. 6) or via wireless transmission to the communication apparatus 23 of the charging activation apparatus 22.

Next, in operation S3.5A/5.10A, the first server apparatus 4 causes provision of the first instance of the charging session ID to the charging activation apparatus 22. This contrasts with FIGS. 3 and 5 in which provision of the first instance of the charging session ID is performed prior to provision of the second instance.

The second part of the alternative pre-charging process flow of FIG. 6 starts with operation S3.16A/5.18A in which the charging session record is transmitted by the charging activation apparatus 22. However, in this example, the charging session record is transmitted to the electricity provider EP2 associated with the power outlet 3 and the not to the driver/owner's electricity provider EP1 as is the case in FIGS. 3 and 5.

Upon receipt of the charging session record, the second server apparatus 5 stores the charging session record (or the measured energy usage) in operation S6.1. Subsequently (and finally) in operation S6.2, the second server apparatus 5 causes transmission of a reimbursement request message to the driver/vehicle owner's electricity provider EP2.

Although not illustrated in the Figures, the system 1 may also include a back-up/emergency charging process which can be utilised if the charging session is not originally authorised by the second server apparatus 5 of EP2. This process may include an emergency server belonging to for instance an insurance or road-side assistance company to which the driver is subscribed. In such a process, if the charging activation apparatus 22 receives an indication that the charging session has been declined, the charging activation apparatus 22 may respond by causing transmission of a message (e.g. similar to the $3^{rd}$ message of FIG. 3 or the first message of FIG. 5 but including the charging session ID if it is known by the charging activation apparatus 22) to the emergency server. In response to receiving this, the emergency server may transmit a message including the charging session ID to the second electricity provider EP2. Requests for charging sessions from the emergency server may be automatically authorised, in which case the second instance of the charging session ID is provided, via any suitable means, by the second electricity provider EP2 to the charging activation apparatus 22. On receipt of this, the two charging session IDs are compared and the charging session activated. In such examples, the charging session ID may be accompanied by a charging parameter, for instance restricting the amount of charge that can be consumed in that charging session. The amount of charge may be determined as an amount sufficient to enable the vehicle to get to the closest official charging point. Each driver who subscribes to the insurance/road-side assistance company may be allowed to make use of emergency charging a pre-defined number of times in a given period (e.g. once a year).

Figure 7A:
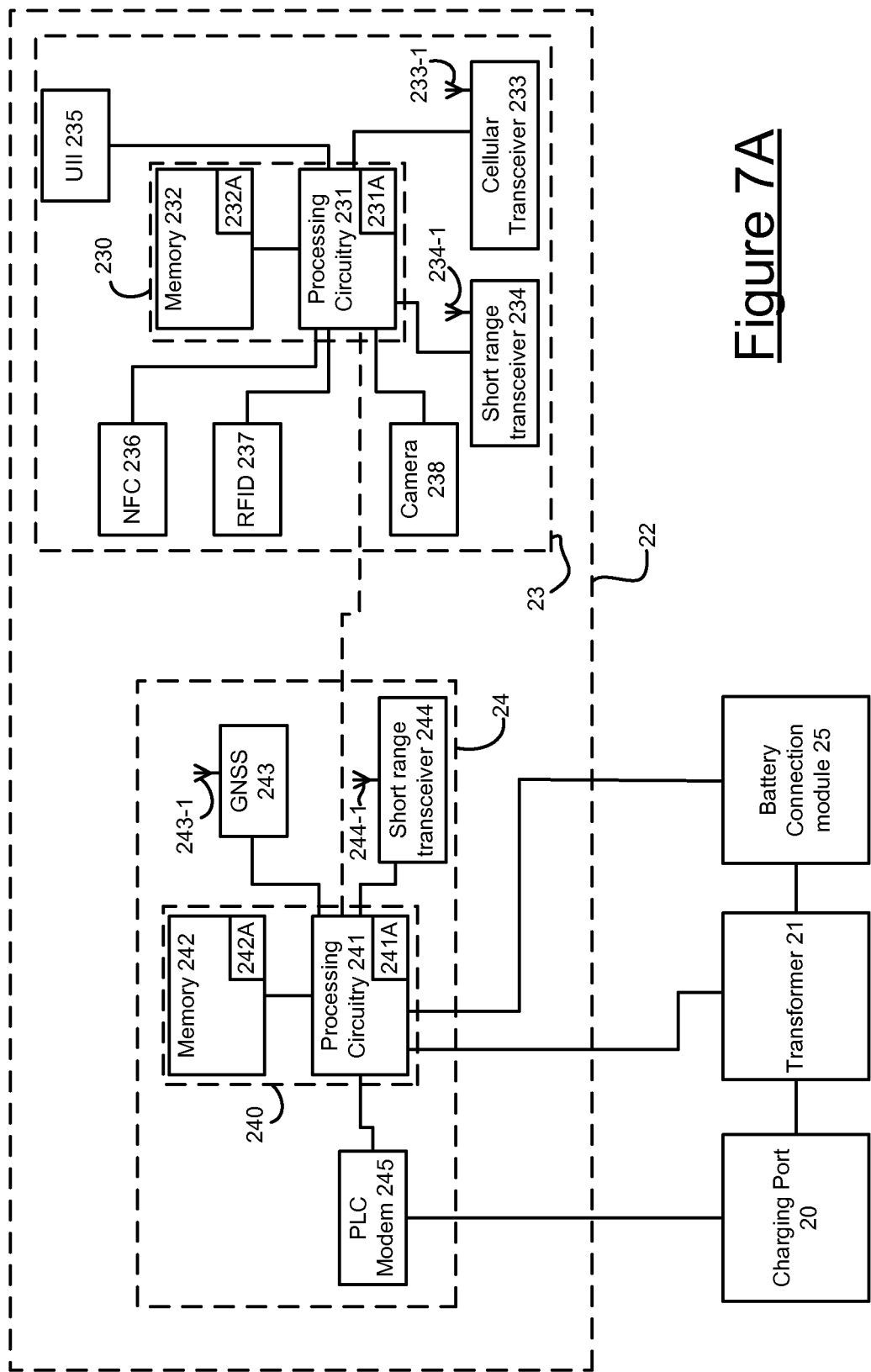
FIG. 7A is a schematic block diagram illustrating various example configurations of the charging activation apparatus, according to one example embodiment.
Figure 7B:
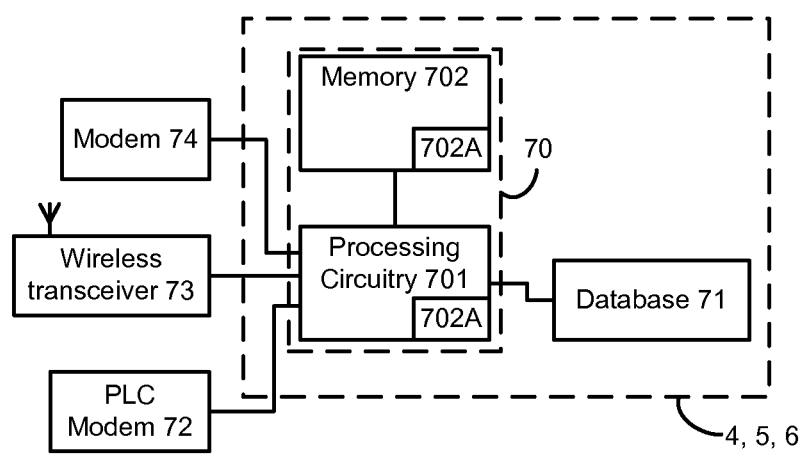
FIG. 7B is a schematic block diagram illustrating various example configurations of the server apparatuses of the system of FIG. 1, according to one example embodiment.
Figure 7B:
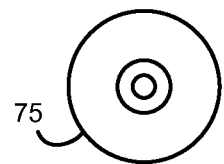

FIGS. 7A and 7B are schematic illustrations of example arrangements of the charging activation apparatus 22 and the various server apparatuses 4, 5, 6.

As can be seen in FIG. 7A, the on-board aspect 24 of the charging activation apparatus 22 includes a controller 240 for performing the various operations described with reference to FIGS. 1 to 6. In particular, the controller 240 is configured to activate the charging session based on data or control signals received from the communication apparatus 23. The charging session may be activated for instance by the controller 240 providing a control signal to at least one of the charging port 20 and transformer 21. The controller 240 of the on-board aspect 24 may also be operable to output data and information to the communication apparatus 23 for transmission to the other entities in the system.

The data may be received from and output to the communication apparatus 23 via a wired connection (not shown) or, for instance when the communication apparatus 23 is a portable device, via a wireless connection. The on-board aspect may thus include a short-range transceiver 244 for receiving data from and transmitting data to the communication apparatus 23. The short-range transceiver 234 may operate using any suitable protocol such as, but not limited to, a Bluetooth protocol or an IEEE 802.11 protocol.

The controller 240 is also operable to monitor the energy consumption during a charging session. This may be performed, for instance, based on signals received from at least one of the charging port 20, the transformer 21 and a battery connection module 25 with which the battery to be charged is connected. The controller may also be configured to detect presence of the electrical connection with the power outlet and/or presence of the charging cable based on signals derived from at least one of the charging port 20 and the transformer.

In some examples, for instance but not limited to those in which the communication apparatus 23 is integrated with the vehicle, the on-board aspect 24 may include a positioning module 243 (e.g. a GNNS module) and associated antenna 243-1 for determining the position of the vehicle 2. As will be appreciated, in some examples, the communication apparatus 23 may include a positioning module and associated antenna, instead of or in addition to the positioning module 243 of the on-board aspect 24.

In examples in which PLC may be utilised, the charging activation apparatus 22, or the on-board aspect 24, may additionally include a PLC modem 245 for demodulating data received w over PLC via the charging port 20. Alternatively, the PLC modem 245 can be embedded with the charging port 20 or the transformer 21, or implemented separately with cabling directing the electrical power to the battery. The demodulated data is then passed on to the controller 240 via a vehicle bus connection for further processing.

The communication apparatus 23 includes at least a cellular transceiver module 233 and associated antenna 233-1 which is configured to transmit wireless messages to the various server apparatuses described with reference to the previous figures. The transceiver module 233 may operate directly under the control of the on-board controller 240 to send/receive messages and data. Alternatively, the on-board controller 240 may communicate (e.g. via the short range transceiver modules) with another controller 230, forming part of the communication apparatus 23 in order to cause the messages to be sent. As discussed previously, the transceiver may be a cellular transceiver 233 configured to transmit and receive data using any suitable cellular data protocol. In other examples, the communication apparatus 23 may additionally or alternatively include a transceiver configured to transmit and receive data over another protocol such as but not limited to an IEEE 802.11 protocol.

In examples in which the on-board aspect 24 and the communication apparatus 23 communicate wirelessly, the communication apparatus additionally includes a short-range wireless transceiver 234 and associated antenna 234-1 configured to communicate wirelessly with the short-range transceiver 244 of the on-board aspect.

One or both of the on-board aspect 24 and the communication apparatus 23 may include a user input interface 235 of any suitable type for enabling the driver of the vehicle to input information, such as but not limited to information displayed on the power outlet.

The communication apparatus 23 may additionally include one or more of an NFC module 236 configured to receive data over NFC, an RFID module 237 configured to receive data over RFID and a camera module 238 for enabling scanning of encoded images, such as bar- or QR-codes.

As will be appreciated, for instance in examples in which the communication apparatus is a portable communication device, the communication apparatus may additionally include various components which are not shown in FIG. 7A. However, because these may not be particularly useful for understanding the processes and operations described in this specification, description of such additional components is omitted.

FIG. 7B is a schematic illustration of an example configuration of the various server apparatuses described with reference to the FIGS. 1 to 6.

The server apparatus 4, 5, 6 includes a controller 70 for performing or causing performance of all the operations assigned the respective server apparatus. In addition to the controller 70, the server apparatus, 4, 5, 6, the server apparatus may include a database 71 for storing data. For instance, in the first and second server apparatuses 4, 5 the database 71 may store information which may include any suitable combination of account IDs, customer information, blacklists, payment information, electric energy consumption information, charging session IDs, data portions A, B and C, authorisation rules and addresses of other electricity providers. The database 71 in the electricity provider identification server apparatus 6 may include any information for enabling it to perform its described function including, for instance, any suitable combination of EP IDs, information relating to the electricity providers, location information relating to power outlets and outlet IDs.

The server apparatuses 4, 5, 6 may be in communicatively coupled with data distribution means for providing data output by the controller 70 to its intended recipient. For instance, the second server apparatus 5 may, in some examples, be coupled with a PLC modem 72 for causing transmission of data and messages to the PLC switchboard function 7 and power outlet 3. The second server apparatus 5 may also or alternatively be communicatively coupled with a wireless transceiver 73 for causing transmission of data and messages over any suitable wireless transmission protocol. The second server apparatus 5 and the first server apparatus 4 may each be coupled to a modem for enabling wired transmission of data via the internet. The first server apparatus 4 may additionally be communicatively coupled with a wireless transceiver 73 for enabling wireless communication with the charging activation apparatus 22. The electricity provider identification server 6 may be coupled to any of the above described data distribution means for enabling it to exchange data with the first server apparatus 4.

Some further details of components and features of the above-described apparatuses 22, 4, 5, 6 and alternatives for them will now be described.

The controllers 230, 240, 70 of the apparatuses 22, 4, 5, 6 comprise processing circuitry 231, 241, 701 communicatively coupled with memory 232, 242, 702, respectively. The memory 232, 242, 702 has computer readable instructions 232A, 242A, 702A stored thereon, which when executed by the processing circuitry 231, 241, 701 causes the processing circuitry 231, 241, 701 to cause performance of relevant the operations described with reference to FIGS. 1 to 7B.

The processing circuitry 231, 241, 701 of any of the apparatuses 22, 4, 5, 6 described with reference to FIGS. 1 to 7 may be of any suitable composition and may include one or more processors 231A, 241A, 701A of any suitable type or suitable combination of types. For example, the processing circuitry 231, 241, 701 may be a programmable processor that interprets computer program instructions 232A, 242A, 702A and processes data. The processing circuitry 231, 241, 701 may include plural programmable processors. Alternatively, the processing circuitry 231, 241, 701 may be, for example, programmable hardware with embedded firmware. The processing circuitry 231, 241, 701 may be termed processing means. The processing circuitry 231, 241, 701 may alternatively or additionally include one or more Application Specific Integrated Circuits (ASICs). In some instances, processing circuitry 231, 241, 701 may be referred to as computing apparatus. In some instances, the one or more processors which make up the processing circuitry of the server apparatuses 4, 5, 6 may be spread over plural different geographic locations.

The processing circuitry 231, 241, 701 is coupled to the respective memory (or one or more storage devices) 232, 242, 702 and is operable to read/write data to/from the memory 232, 242, 702. The memory 232, 242, 702 may comprise a single memory unit or a plurality of memory units, upon which the computer readable instructions (or code) 232A, 242A, 702A is stored. For example, the memory 232, 242, 702 may comprise both volatile memory and non-volatile memory. For example, the computer readable instructions 232A, 242A, 702A may be stored in the non-volatile memory and may be executed by the processing circuitry 231, 241, 701 using the volatile memory for temporary storage of data or data and instructions. Examples of volatile memory include RAM, DRAM, and SDRAM etc. Examples of non-volatile memory include ROM, PROM, EEPROM, flash memory, optical storage, magnetic storage, etc. The memories in general may be referred to as non-transitory computer readable memory media. The databases 70 may include any suitable combination of different types of memory medium.

The term 'memory', in addition to covering memory comprising both non-volatile memory and volatile memory, may also cover one or more volatile memories only, one or more non-volatile memories only, or one or more volatile memories and one or more non-volatile memories.

The computer readable instructions 232A, 242A, 702A may be pre-programmed into the apparatuses 22, 4, 5, 6. Alternatively, the computer readable instructions 232A, 242A, 702A may arrive at the apparatus 22, 4, 5, 6 via an electromagnetic carrier signal or may be copied from a physical entity 76 (see FIG. 7B) such as a computer program product, a memory device or a record medium such as a CD-ROM or DVD. The computer readable instructions 232A, 242A, 702A may provide the logic and routines that enables the devices/apparatuses 22, 4, 5, 6 to perform the functionality described above. The combination of computer-readable instructions stored on memory (of any of the types described above) may be referred to as a computer program product.

Where applicable, the Bluetooth-capability of the apparatuses 22, 4, 5, 6 may be provided by a single integrated circuit. It may alternatively be provided by a set of integrated circuits (i.e. a chipset). The Bluetooth-capability may alternatively be a hardwired, application-specific integrated circuit (ASIC). Any Bluetooth capability may in accordance with or backwards compatible with the Bluetooth Core Specification 4.2.

As will be appreciated, the apparatuses 22, 4, 5, 6 described herein may include various hardware components which have may not been shown in the Figures. For instance, the portable communications device 4 may in some implementations be a mobile telephone or a tablet computer and so may contain components commonly included in a device of the specific type. Similarly, the apparatuses 22, 4, 5, 6 may comprise further optional software components which are not described in this specification since they may not have direct interaction to embodiments of the invention.

Embodiments of the present invention may be implemented in software, hardware, application logic or a combination of software, hardware and application logic. The software, application logic and/or hardware may reside on memory, or any computer media. In an example embodiment, the application logic, software or an instruction set is maintained on any one of various conventional computer-readable media. In the context of this document, a "memory" or "computer-readable medium" may be any media or means that can contain, store, communicate, propagate or transport the instructions for use by or in connection with an instruction execution system, apparatus, or device, such as a computer.

Reference to, where relevant, "computer-readable storage medium", "computer program product", "tangibly embodied computer program" etc., or a "processor" or "processing circuitry" etc. should be understood to encompass not only computers having differing architectures such as single/multi-processor architectures and sequencers/parallel architectures, but also specialised circuits such as field programmable gate arrays FPGA, application specify circuits ASIC, signal processing devices and other devices. References to computer program, instructions, code etc. should be understood to express software for a programmable processor firmware such as the programmable content of a hardware device as instructions for a processor or configured or configuration settings for a fixed function device, gate array, programmable logic device, etc.

As used in this application, the term 'circuitry' refers to all of the following: (a) hardware-only circuit implementations (such as implementations in only analogue and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes various examples, these descriptions should not be viewed in a limiting sense. Rather, there are several variations and modifications which may be made without departing from the scope of the present invention as defined in the appended claims.

The invention claimed is:

1. Apparatus comprising:
   at least one processor; and
   at least one memory including computer program code, which when executed by the at least one processor, cause a charging activation apparatus associated with an electric vehicle:
   to receive a first instance of a charging session ID from first server apparatus associated with a first electricity provider which is the electricity provider of a driver or owner of the electric vehicle;
   to receive a second instance of the charging session ID from second server apparatus associated with a second electricity provider which is the electricity provider for a power outlet with which the electric vehicle is currently electrically connected, wherein the second electricity provider is different from the first electricity provider;
   to compare the first and second instances of the charging session ID;

to determine if the first and second instances of the charging session ID correspond;

if the first and second instances of the charging session ID are determined to correspond, to cause activation of charging of the electric vehicle via the electrical connection to the power outlet; and if the first and second instances of the charging session ID are determined not to correspond, to prevent the charging of the electric vehicle via the electrical connection to the power outlet.

2. The apparatus of claim 1, wherein the computer program code, when executed by the at least one processor, causes the charging activation apparatus:

to measure a consumption of electricity by the electric vehicle whilst charging; and to respond to a determination that charging of the electric vehicle has finished by outputting information including the measured consumption and the charging session ID for provision to at least one of the first server apparatus and the second server apparatus.

3. The apparatus of claim 1, wherein the computer program code, when executed by the at least one processor, further causes the charging activation apparatus:

to receive from the power outlet identification information for enabling identification of the second electricity provider, wherein the identification information for enabling the identification of the second electricity provider enables identification of a customer of the second service provider with which the power outlet is associated; and to output the identification information for enabling identification of the second electricity provider for provision to at least one of the first and second server apparatuses.

4. The apparatus of claim 1, wherein the computer program code, when executed by the at least one processor, causes the charging activation apparatus:

following a determination that it is desired to charge the electric vehicle using the power outlet, to output for transmission to the first server apparatus information including at least customer identification information for enabling the first electricity provider to identify the driver or owner, wherein the information output by the charging activation apparatus includes a vehicle ID for enabling identification of the electric vehicle.

5. The apparatus of claim 1, wherein the computer program code, when executed by the at least one processor, causes the charging activation apparatus:

in response to determining that it is desired to charge the electric vehicle using the power outlet, to output a charging request to the power outlet via power line communication over the electrical connection between the electric vehicle and the power outlet.

6. The apparatus of claim 1, wherein the computer program code, when executed by the at least one processor, causes the charging activation apparatus:

to receive the second instance of the charging entry ID from the second server apparatus via power line communication over the electrical connection with the power outlet.

7. The apparatus of claim 3, wherein the identification information for enabling identification of the second electricity provider is received by the charging activation apparatus via power line communication over the electrical connection between the electric vehicle and the power outlet.

8. The apparatus of claim 1, wherein the computer program code, when executed by the at least one processor, causes the charging activation apparatus:

to output location information indicating a current location of the electric vehicle for provision to a third server apparatus configured to identify the second electricity provider based on at least the location information, to receive a power outlet ID enabling identification of the power outlet; and to output the power outlet ID and the location information for provision to the third server apparatus which is configured to identify the second electricity provider based on the location information and the power outlet ID.

9. A method comprising:

receiving, by a charging activation apparatus associated with an electric vehicle, a first instance of a charging session ID from first server apparatus associated with a first electricity provider which is the electricity provider of a driver or owner of the electric vehicle;

receiving, by the charging activation apparatus, a second instance of the charging session ID from second server apparatus associated with a second electricity provider which is the electricity provider for a power outlet with which the electric vehicle is currently electrically connected, wherein the second electricity provider is different from the first electricity provider;

comparing, by the charging activation apparatus, the first and second instances of the charging session ID;

determining, by the charging activation apparatus, if the first and second instances of the charging session ID correspond;

if the first and second instances of the charging session ID are determined to correspond, causing activation of charging of the electric vehicle via the electrical connection to the power outlet; and if the first and second instances of the charging session ID are determined not to correspond, preventing the charging of the electric vehicle via the electrical connection to the power outlet.

10. The method of claim 9, comprising:

measuring, by the charging activation apparatus, a consumption of electricity by the electric vehicle whilst charging; and responding to a determination that charging of the electric vehicle has finished by outputting information including the measured consumption and charging session ID for provision to at least one of the first server apparatus and the second server apparatus.

11. The method of claim 9, comprising receiving from the power outlet identification information for enabling identification of the second electricity provider, wherein the identification information for enabling the identification of the second electricity provider enables identification of a customer of the second service provider with which the power outlet is associated;

outputting, by the charging activation apparatus, the identification information for enabling identification of the second electricity provider for provision to at least one of the first and second server apparatuses.

12. The method of claim 9, comprising:

following a determination that it is desired to charge the electric vehicle using the power outlet, the charging activation apparatus outputting for transmission to the first server apparatus information including at least customer identification information for enabling the first electricity provider to identify the driver or owner, wherein the information output by the charging activation apparatus includes a vehicle ID for enabling identification of the electric vehicle.

13. The method of claim 9, comprising:
in response to determining that it is desired to charge the electric vehicle using the power outlet, outputting a charging request to the power outlet via power line communication over the electrical connection between the electric vehicle and the power outlet.

14. The method of claim 11, wherein the identification information for enabling identification of the second electricity provider is received by the charging activation apparatus via power line communication over the electrical connection between the electric vehicle and the power outlet.

15. The method of claim 9, comprising:
outputting, by the charging activation apparatus, location information indicating a current location of the electric vehicle for provision to a third server apparatus configured to identify the second electricity provider based on at least the location information;
receiving, by the charging activation apparatus, a power outlet ID enabling identification of the power outlet; and
outputting, by the charging activation apparatus, the power outlet ID and the location information for provision to the third server apparatus which is configured to identify the second electricity provider based on the location information and the power outlet ID.

16. The method of claim 9, comprising:
outputting, by the second server apparatus, the charging session ID for provision to the charging activation in response to the charging session being authorized.

17. The method of claim 9, comprising:
creating, by the first server apparatus, the charging session ID;
outputting, by the first server apparatus, the charging session ID to the charging activation apparatus and the second server apparatus.

18. The method of claim 9, comprising:
creating, by the second server apparatus, the charging session ID.

19. The method of claim 18, comprising:
outputting, by the second server apparatus, the charging session ID to the charging activation apparatus and the first server apparatus.

20. The method of claim 9, wherein the charging session ID is created based on customer identification information for enabling the first electricity provider to identify the driver and identification of a customer of the second service provider with which the power outlet is associated.

21. Apparatus comprising:
at least one processor; and
at least one memory including computer program code, which when executed by the at least one processor, cause a charging activation apparatus associated with an electric vehicle:
to receive a first instance of a charging session ID from first server apparatus associated with a first electricity provider which is the electricity provider of a driver or owner of the electric vehicle;
to receive a second instance of the charging session ID from second server apparatus associated with a second electricity provider which is the electricity provider for a power outlet with which the electric vehicle is currently electrically connected;
to compare the first and second instances of the charging session ID;
to determine if the first and second instances of the charging session ID correspond and, if the first and second instances of the charging session ID are determined to correspond, to cause activation of charging of the electric vehicle via the electrical connection to the power outlet;
to output location information indicating a current location of the electric vehicle for provision to a third server apparatus configured to identify the second electricity provider based on at least the location information;
to receive a power outlet ID enabling identification of the power outlet; and
to output the power outlet ID and the location information for provision to the third server apparatus which is configured to identify the second electricity provider based on the location information and the power outlet ID.

22. A method comprising:
receiving, by a charging activation apparatus associated with an electric vehicle, a first instance of a charging session ID from first server apparatus associated with a first electricity provider which is the electricity provider of a driver or owner of the electric vehicle;
receiving, by the charging activation apparatus, a second instance of the charging session ID from second server apparatus associated with a second electricity provider which is the electricity provider for a power outlet with which the electric vehicle is currently electrically connected;
comparing, by the charging activation apparatus, the first and second instances of the charging session ID;
determining, by the charging activation apparatus, if the first and second instances of the charging session ID correspond and, if the first and second instances of the charging session ID are determined to correspond, causing activation of charging of the electric vehicle via the electrical connection to the power outlet;
outputting, by the charging activation apparatus, location information indicating a current location of the electric vehicle for provision to a third server apparatus configured to identify the second electricity provider based on at least the location information;
receiving, by the charging activation apparatus, a power outlet ID enabling identification of the power outlet; and
outputting, by the charging activation apparatus, the power outlet ID and the location information for provision to the third server apparatus which is configured to identify the second electricity provider based on the location information and the power outlet ID.

* * * * *